(12) United States Patent
Xie et al.

(10) Patent No.: US 11,813,836 B1
(45) Date of Patent: Nov. 14, 2023

(54) DETACHABLE AND COMPOSABLE SCREEN PROTECTOR

(71) Applicant: Zhongliu Xie, Guangdong (CN)

(72) Inventors: Zhongliu Xie, Guangdong (CN); Jiahao Shi, Guangdong (CN)

( * ) Notice: Subject to any disclaimer, the term of this patent is extended or adjusted under 35 U.S.C. 154(b) by 0 days.

(21) Appl. No.: 18/157,748

(22) Filed: Jan. 20, 2023

(51) Int. Cl.
  *B32B 7/12* (2006.01)
  *G06F 1/16* (2006.01)
  *B32B 27/40* (2006.01)

(52) U.S. Cl.
  CPC ............... *B32B 7/12* (2013.01); *B32B 27/40* (2013.01); *G06F 1/16* (2013.01); *B32B 2307/412* (2013.01); *B32B 2307/51* (2013.01); *G06F 2200/1634* (2013.01)

(58) Field of Classification Search
  CPC ..... B32B 7/12; B32B 27/40; B32B 2307/412; B32B 2307/51; G06F 1/16; G06F 2200/1634
  See application file for complete search history.

(56) References Cited

U.S. PATENT DOCUMENTS

| | | | |
|---|---|---|---|
| 4,204,231 A * | 5/1980 | Permenter | H01J 29/86 348/824 |
| 4,907,090 A * | 3/1990 | Ananian | H04N 5/65 348/823 |
| 6,847,492 B2 * | 1/2005 | Wilson | G02B 3/0068 428/41.7 |
| 6,870,686 B2 * | 3/2005 | Wilson | B60J 1/2094 428/40.1 |
| 8,044,942 B1 * | 10/2011 | Leonhard | G06F 3/0393 345/173 |
| 8,693,102 B2 * | 4/2014 | Wilson | B32B 7/06 359/630 |
| 8,974,620 B2 * | 3/2015 | Wilson | B32B 7/06 156/289 |
| 9,104,256 B2 * | 8/2015 | Wilson | B32B 37/0076 |
| 9,128,545 B2 * | 9/2015 | Wilson | B32B 37/18 |
| 9,274,625 B2 * | 3/2016 | Wilson | G06F 3/0412 |
| 9,283,731 B2 * | 3/2016 | Leonhard | G06F 3/0412 |
| 9,471,163 B2 * | 10/2016 | Wilson | B32B 7/06 |
| 9,582,039 B2 * | 2/2017 | Leonhard | G06F 3/0393 |
| 9,582,040 B2 * | 2/2017 | Leonhard | G06F 3/0393 |
| 10,345,934 B2 * | 7/2019 | Wilson | B32B 37/0076 |
| 10,401,988 B2 * | 9/2019 | Leonhard | G06F 3/041 |
| 10,620,670 B2 * | 4/2020 | Wilson | C09J 7/22 |

(Continued)

FOREIGN PATENT DOCUMENTS

| | | | | |
|---|---|---|---|---|
| CN | 214927895 U | 11/2021 | | |
| CN | 216639379 U | 5/2022 | | |
| GB | 2124147 A * | 2/1984 | | B32B 7/06 |

*Primary Examiner* — Patricia L. Nordmeyer

(57) ABSTRACT

A detachable and composable screen protector capable of being installed and removed easily and repeatedly, flexibly enhancing the screen with different functions, including anti-scratch, anti-glare, anti-peeping, blue-light reduction, or simulation of paper-feel writing experience, in order to cater for circumstances with changing usage scenarios. The screen protector comprises N layers of functional films and adsorption sheets, each layer is attached either to its previous layer or directly to the screen. Moreover, the screen protector can be decomposed and re-composed in a different way, such as with a different set of functional films, without going through re-manufacturing or the use of extra tools.

21 Claims, 26 Drawing Sheets

(56) References Cited

U.S. PATENT DOCUMENTS

| | | | |
|---|---|---|---|
| 10,656,364 B2 | 5/2020 | Lin | |
| 10,824,195 B2* | 11/2020 | Leonhard | H04B 1/3888 |
| 11,059,266 B2* | 7/2021 | Wilson | G06F 3/041 |
| 11,281,253 B2* | 3/2022 | Wilson | B32B 33/00 |
| 2002/0159159 A1* | 10/2002 | Wilson | B32B 7/06 |
| | | | 359/630 |
| 2005/0002108 A1* | 1/2005 | Wilson | B32B 37/12 |
| | | | 359/630 |
| 2007/0019300 A1* | 1/2007 | Wilson | B32B 7/12 |
| | | | 359/642 |
| 2011/0279383 A1* | 11/2011 | Wilson | B32B 37/18 |
| | | | 345/173 |
| 2012/0183713 A1* | 7/2012 | Leonhard | G06F 3/041 |
| | | | 428/41.7 |
| 2012/0188743 A1* | 7/2012 | Wilson | G06F 3/0412 |
| | | | 493/344 |
| 2013/0089688 A1* | 4/2013 | Wilson | B32B 3/02 |
| | | | 428/40.1 |
| 2013/0209752 A1* | 8/2013 | Wilson | B32B 7/12 |
| | | | 156/60 |
| 2013/0309433 A1* | 11/2013 | Hsu | C09J 7/38 |
| | | | 428/38 |
| 2013/0316112 A1* | 11/2013 | Leonhard | C09J 7/29 |
| | | | 428/323 |
| 2014/0072749 A1* | 3/2014 | Leonhard | G06F 3/0393 |
| | | | 428/137 |
| 2014/0220283 A1* | 8/2014 | Wilson | B32B 3/266 |
| | | | 428/40.1 |
| 2014/0247489 A1* | 9/2014 | Wilson | B32B 7/12 |
| | | | 156/60 |
| 2015/0013891 A1* | 1/2015 | Wilson | B32B 7/12 |
| | | | 156/250 |
| 2015/0132522 A1* | 5/2015 | Wilson | B32B 7/06 |
| | | | 428/41.7 |
| 2015/0177863 A1* | 6/2015 | Wilson | G06F 3/0412 |
| | | | 156/60 |
| 2015/0286327 A1* | 10/2015 | Chakrabarti | G06F 3/041 |
| | | | 359/359 |
| 2015/0309609 A1* | 10/2015 | Wilson | B32B 3/06 |
| | | | 345/173 |
| 2017/0031525 A1* | 2/2017 | Wilson | G06F 1/1656 |
| 2017/0147100 A1* | 5/2017 | Wilson | G06F 3/041 |
| 2017/0160828 A1* | 6/2017 | Leonhard | G06F 3/041 |
| 2019/0050025 A1* | 2/2019 | Wilson | G06F 3/041 |
| 2019/0094914 A1* | 3/2019 | Wilson | C09J 7/20 |
| 2020/0168380 A1 | 5/2020 | Pi | |
| 2020/0183460 A1* | 6/2020 | Wilson | C09J 7/22 |
| 2022/0075424 A1* | 3/2022 | Wilson | G06F 3/0412 |

* cited by examiner

DETACHABLE AND COMPOSABLE SCREEN PROTECTOR

Technical Field

The present disclosure relates generally to screen protectors of electronic displays, and more specifically to a detachable and composable screen protector capable of being installed on and removed off the surface of a screen easily and repeatedly, flexibly enhancing the screen with different functions to cater for circumstances with changing usage scenarios..

Description of the Related Art

There is a variety of screen protectors on the market today, which is able to enhance the screen of an electronic device with different functions, such as anti-scratch, anti-glare, anti-peeping, blue light reduction, or simulation of paper-feel writing experience. The advent of these products greatly enhances user experience in various usage scenarios. However, in circumstances where the usage scenario changes from one to another, the installed screen protector may no longer best serve the new purpose, and therefore should be removed and replaced with a more suitable one. For example, suppose an anti-peeping screen protector was installed when a user was reading private content on a tablet while taking a bus home. Later when arrived, the user then no longer needs privacy protection but instead wants some enhanced writing experience as s/he begins to take some notes with the same device in his/her bedroom. In this case, the anti-peeping screen protector is better replaced with a paper-feel one. A reverse situation may occur when the user first writes at home and then reads on the bus.

However, most existing screen protectors are installed via adhesives, and are thus not easily removable without making damages or marks. Many often require extra tools to help with removal. This points to the demand of an easily detachable screen protector, capable of being installed and removed repeatedly, without using extra tools while keeping the screen and the screen protector intact.

Some paper-feel films have adopted some kind of detachable mechanism by binding some adsorption structure to the film. There are two types of adsorption structures are typically used: adhesive structures and magnetic structures. The adhesive solution is to apply some kind of low-tack glue that produces a non-permanent joint to enable the film to be detachable from the screen when installed. This solution has three drawbacks. First of all, it adsorbs dust and other particles in the atmosphere, making it difficult to clean and meanwhile lowering overall adhesive capacity over time. Secondly, it is sticky to hands and other small objects nearby during installation, such as paper or hair, hampering user experience. Last but not least, the screen protector adheres to the screen as soon as the adhesive structure contacts the screen surface, which makes it inconvenient to adjust the installation position of the screen protector and requires external forces to pull it off the screen surface before making adjustment, resulting in degraded user experience.

The magnetic solution, on the other hand, uses permanent magnets or soft magnetic materials to attach the film to the screen. This solution requires the screen device also having permanent magnets or soft magnetic materials inside or underneath it, greatly complicating screen/device design, especially concerning the strength and distribution of magnetic force, which is supposed to be strong enough to draw the screen protector to the screen surface and hold it steady during installation, and meanwhile quickly reduce to almost zero after user pulling the screen protector off a small distance up removal. In reality, few existing solutions offer such a good balance, and in many cases the magnetic force is not strong enough and the film can easily slip away during user writing. In addition, a magnetic screen protector, when installed, can be easily pulled away by other magnetic accessories of the electronic device, such as a magnetic case or cover, or other magnetic objects in the environment. For that reason, neither solution seems good enough.

In addition to changing usage scenarios, sometimes there is also a requirement to combine multiple aforementioned functions together, given the usage scenario becomes more complex and any single function is inadequate to meet its requirement. For example, when writing private content in public space, probably both anti-peeping privacy protection and enhanced writing experience are desirable.

In the related art, some solutions exist to offer composite functions, such as certain anti-peeping paper-feel screen protectors, yet in these solutions composition is permanent and is generally carried out during manufacturing, which means the associated functions cannot be altered afterwards to adapt to changing usage scenarios, such as switching from writing private content in public space, to watching films at home with a kid who is sensitive to blue light and glare, or taking notes in a chaotic environment that risks scratching the screen.

To the best of our knowledge, none of the existing solutions can cater for circumstances with complex changing usage scenarios that require one set of functions at one time and then a partially or totally different set at another, without going through re-manufacturing or the use of extra tools.

SUMMARY OF THE INVENTION

In view of the foregoing disadvantages inherent in the known types of screen protectors, the present disclosure provides a detachable screen protector that is capable of being installed and removed easily and repeatedly, flexibly enhancing the screen with different functions to cater for circumstances with changing usage scenarios, without the need of extra tools. The detachable screen protector comprises a functional film and at least one adsorption sheet; the functional film comprises a front surface facing towards the screen and a back surface; and the adsorption sheet(s) has a first side that is permanently fixed to the front surface of the functional film in a margin area, and a second side that contacts the surface of a screen.

During installation, the front surface of the functional film is placed on the screen surface; by pressing on the back surface of the functional film around the area above the adsorption sheet(s), the adsorption sheet is elastically deformed to fit to the screen surface, removing the air between them and forming a hermetically sealed area with lower air pressure than the atmosphere, wherein the air pressure difference then generates a force attaching the screen protector to the screen surface; the screen surface in this context includes both the immediate surface of the screen and the surface of the screen frame. After installation, by refilling air in between the adsorption sheet(s) and the screen, the screen protector may be easily detached from the screen surface for re-use later.

The present disclosure also includes a detachable and composable screen protector, capable of being installed and removed easily and repeatedly, as well as flexibly altering its functionalities through de-composition and re-composition while in use. It has a non-permanent multi-layer structure that comprises N layers, each layer is attached to its previous layer except for the first layer which attaches directly to the screen. Each layer may be installed and removed separately, and comprises a functional film and at least one adsorption sheet. Each functional film comprises a front surface facing towards the screen and a back surface. Each adsorption sheet has a first side that is permanently fixed to the front surface in a margin area, of the functional film in the same layer.

During installation, the front surface of the functional film in the first layer is placed on the surface of the screen; then from the second to the Nth layers, the front surface of the functional film in each layer is placed on top of the back surface of the functional film in the previous layer. For each layer, by directly or indirectly pressing on the back surface of the functional film around the area above the adsorption sheet(s), the adsorption sheet is elastically deformed to fit to the back surface of the functional film in the smooth region, removing the air between them and forming a hermetically sealed area with lower air pressure than the atmosphere, which then generates a force attaching the current layer to the previous layer or the screen surface. Afterwards, by refilling air in between the adsorption sheet(s) and the previous layer or the screen, each individual layer or the overall screen protector may be easily detached for re-use later.

BRIEF DESCRIPTION OF DRAWINGS

The drawings forming part of this application are supposed to facilitate understanding of the present disclosure, and should not constitute any undue limitation of the disclosure, and wherein.

Figure 1:
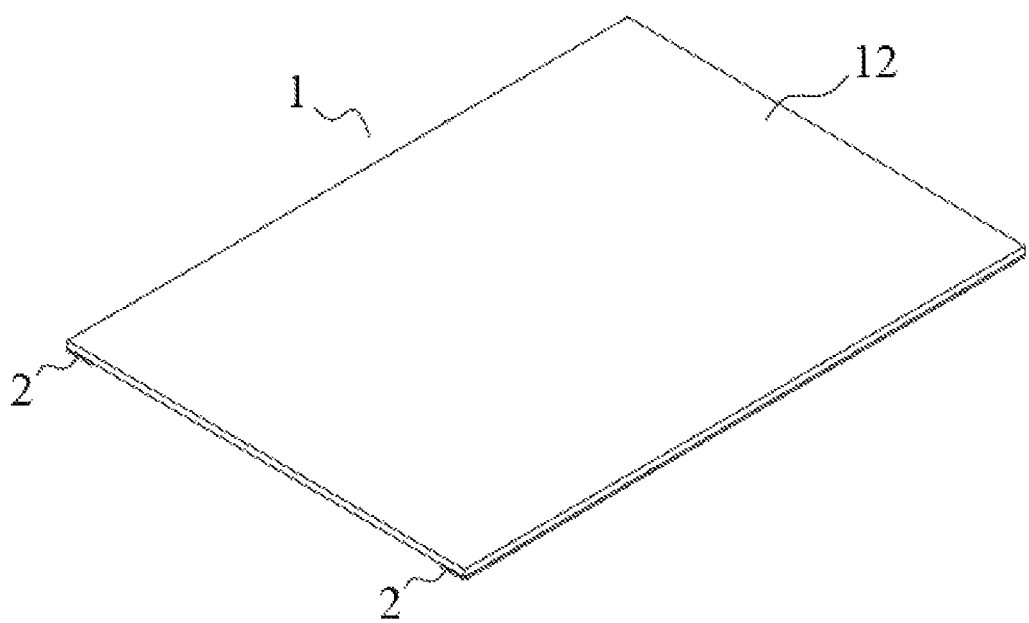
FIG. 1 is a schematic diagram of the detachable screen protector in Embodiment 1 and Embodiment 2.
Figure 2:
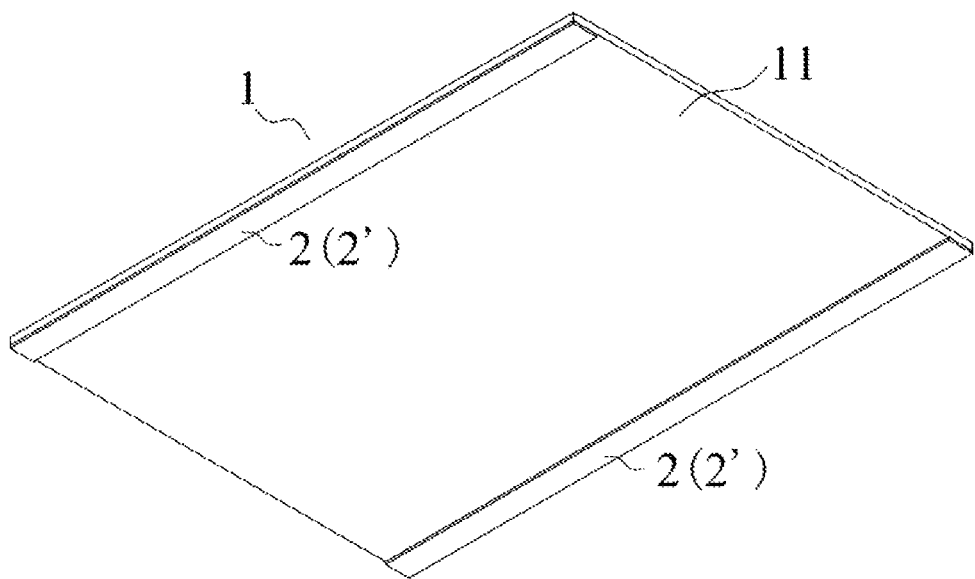
FIG. 2 is a schematic diagram of the adsorption sheets installed on the front surface of the functional film in the detachable screen protector in Embodiment 1 and Embodiment 2.
Figure 3:
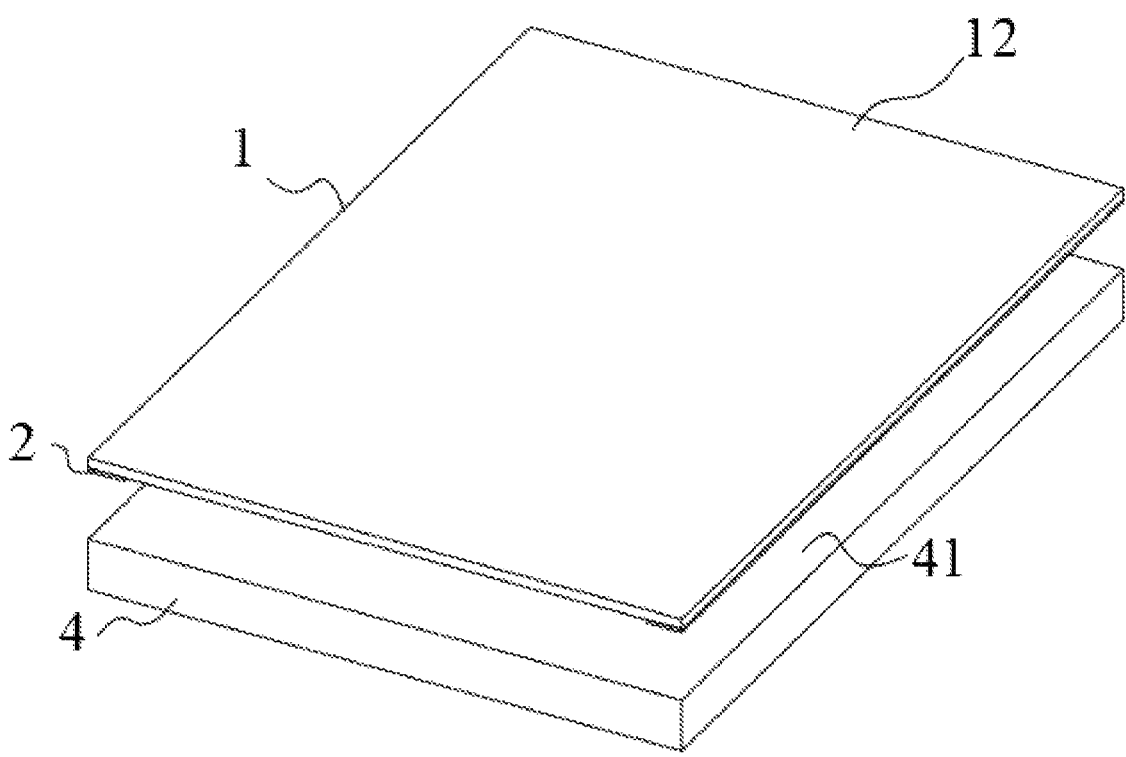
FIG. 3 illustrates the detachable screen protector in Embodiment 1 and Embodiment 2 in a status of not being attached to the screen.
Figure 4:
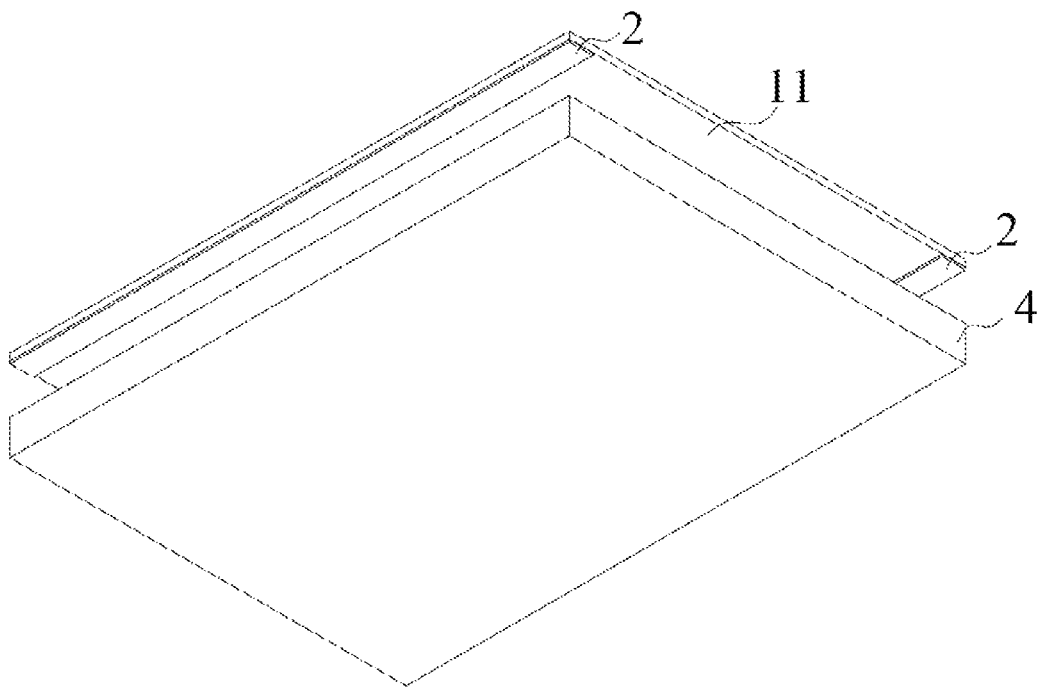
FIG. 4 illustrates the adsorption sheets on the back of the detachable screen protector in Embodiment 1 and Embodiment 2 in a status of not being attached to the screen.
Figure 5:
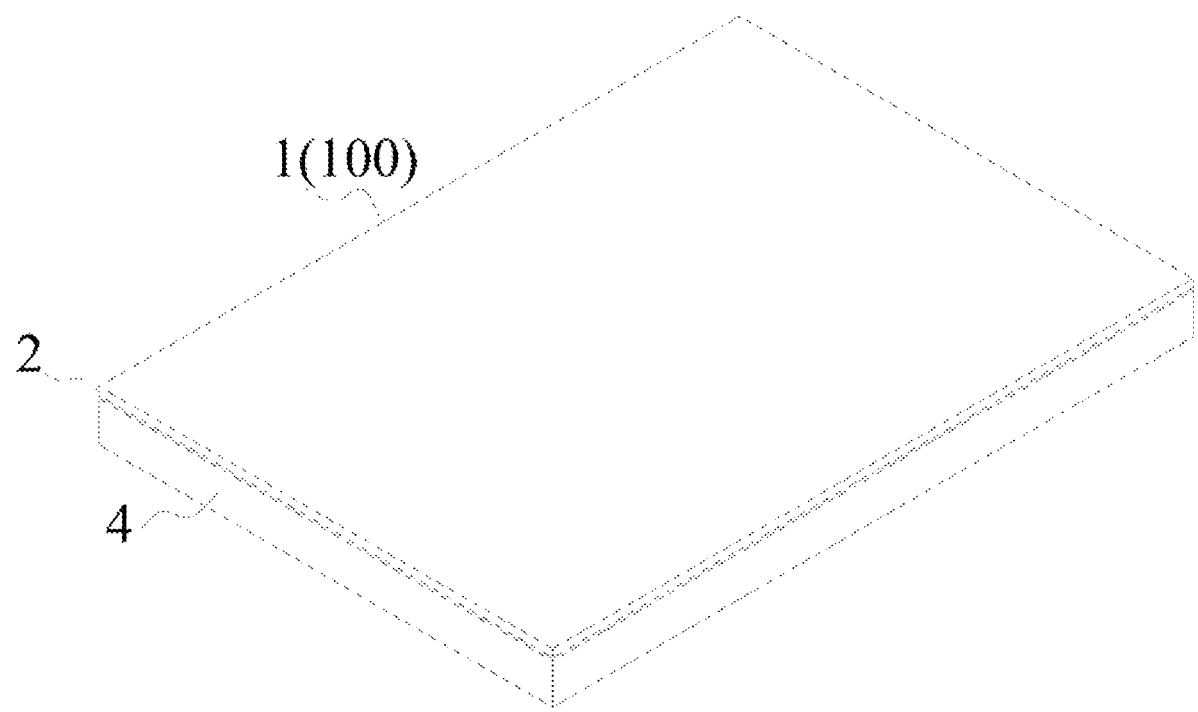
FIG. 5 illustrates the detachable screen protector in Embodiment 1 and Embodiment 2 in a status of being attached to the screen.

Description of the Attached Markings:
100—screen protector; 1—functional film;
11, 31—front surface; 12, 32—back surface; 1*a*—anti-peeping film; 1*b*—paper-feel film;
2—adsorption sheet(s); 2'—margin area; 21—first side; 22—second side;
2*a*—adsorption sheet(s) in the first layer; 2*b*—adsorption sheet(s) in the second layer; 2*c*—adsorption sheet(s) in the third layer; 2m—adsorption sheet(s) in the (N−1)th layer; 2n—adsorption sheet(s) in the Nth layer;

3—functional film; 321—smooth regions;

3a—functional film in the first layer; 3b—functional film in the second layer; 3c13 functional film in the third layer; 3m—functional film in the (N−1)th layer; 3n—functional film in the Nth layer;

4—screen; 41—external surface of the screen or screen frame;

5—atmosphere; 6—space pending air removal;

DETAILED DESCRIPTION OF THE INVENTION

The present disclosure will be described in more details below with reference to the accompanying drawings and in conjunction with embodiments. The examples are provided for better illustration of the present disclosure and should not limit the scope of the present disclosure. In practice, technicians skilled in the art might make small modifications and/or variations of the present disclosure without departing from the scope or spirit of the present disclosure. For example, features described in part of one embodiment may be used in another to create a new embodiment. It is therefore desirable that the present disclosure encompass such modifications and/or variations falling within the scope of the appended claims and their equivalents.

In the description of the present disclosure, terms like "longitudinal", "transverse", "up", "down", "front", "back", "left", "right", "vertical", "horizontal", "top", "bottom" denote orientation or positional relationships based on those shown in the drawings and are intended for ease of description only, which in no way entails that the present disclosure must be constructed and operated in a particular orientation and therefore cannot be construed as limiting to the present disclosure. Terms like "joint", "attach" and "set" used in the present disclosure should be understood in a broad sense, for example, may indicate a direct connection or indirect connection through intermediate components; and it may be a wired electrical connection, a radio connection, or a wireless communication signal connection. The term "composable" in the present application is used to mean "to be made of many parts". The exact meanings of the above terms may slightly differ and should be derived from the actual situation by technicians skilled in the art accordingly.

A number of examples of the present disclosure are shown in the accompanying drawings, wherein the numeric and alphabetic markers used in the detailed description refer to features in the drawings. Reference signs in the drawings and descriptions may refer to similar parts of the present disclosure. As used herein, terms like "first", "second" and "third" are used interchangeably to distinguish one member from another and are not intended to denote the location or importance of individual members.

The present disclosure provides a detachable screen protector 100 that is capable of being installed and removed easily and repeatedly, flexibly enhancing the screen 4 with different functions to cater for circumstances with changing usage scenarios, without the need of extra tools. The detachable screen protector 100 comprises a functional film 1 and at least one adsorption sheet 2; the functional film 1 comprises a front surface 11 facing towards the screen 4 and a back surface 12; and the adsorption sheet(s) 2 has a first side 21 that is permanently fixed to the front surface 11 of the functional film 1 in a margin area 2', and a second side 22 that contacts the surface of a screen 4.

During installation, the front surface 11 of the functional film 1 is placed on the screen surface 41; by pressing on the back surface 12 of the functional film 1 around the area above the adsorption sheet(s) 2, the air between the adsorption sheet(s) 2 and the screen 4 will be removed, the screen protector 100 is then attached to the screen surface 41; the screen surface 41 in this context includes both the immediate surface of the screen 4 and the surface of the screen frame. After installation, by refilling air in between the adsorption sheet(s) 2 and the screen 4, the screen protector 100 may be easily detached from the screen surface 41 for re-use later.

Technically, after pressing the back surface 12 of the functional film 1 to remove the air, a hermetically sealed low-pressure or vacuum area will be formed in the space between the adsorption sheet(s) 2 and the screen 4. The hermetically sealed low-pressure or vacuum area has a very small or even zero air pressure, and its air pressure difference with the atmosphere 5 then generates a strong force and pushes the screen protector 100 to the screen surface 41, with sufficient friction to prevent it from slipping away during user writing or performing other tasks on the device. After refilling air in between the contact surfaces, for example by making a small gap using a fingernail, the air pressure difference quickly drops to almost zero, making the screen protector 100 easily detachable.

In this case, the screen protector 100 can be installed and removed easily and repeatedly, without the need of extra tools during installation or removal. When the usage scenario changes, the installed functional film 1 may be easily replaced with a more suitable one. This technical solution is named "air adsorption" in this article.

Furthermore, since the screen protector 100 does not use adhesives, this solution has three advantages: 1. the adsorption capacity does not reduce over time, as dust and particles in the environment will not stick to the surface of the adsorption sheet(s) 2, and the screen protector 100 can be easily cleaned by normal cleaning methods in case some dirt gathered on its surface; 2. no damages or marks will be left on the surfaces of both the screen protector 100 and the screen 4 after repeatedly attaching and detaching from each other; 3. when the adsorption sheet(s) 2 initially contacts the screen surface 41, there will be no adsorption force until pressing on the back surface 12 of the functional film 1 to remove the air, thereby the screen protector 100 can be easily adjusted to the correct position before making attachment.

In addition, since the screen protector 100 does not resort to magnetism for attachment, it does not require the screen 4 or the device containing the screen 4 to have permanent magnets or soft magnetic materials inside or underneath it, and meanwhile will not be pulled away by magnetic accessories of the device, or other magnetic objects in the environment.

Furthermore, the primary material of adsorption sheet 2 is elastic polymer. More specifically, the adsorption sheet 2 may be made of any of the following materials: rubber, silicone rubber, silicone resin, thermoplastic elastomers (TPE), thermoplastic polyurethanes (TPU), soft polyvinyl chloride (PVC), thermoplastic hydrogel (TPH), polyurethane (PU) and polyethylene terephthalate (PETE).

Technically, the adsorption sheet 2 made of elastic polymer is able to be elastically deformed during installation and fit perfectly to the screen surface 41, filling tiny gaps in between and form a hermetically sealed flat area. In this case, the air pressure difference between the hermetically sealed flat area and the atmosphere 5 can last over a long time, generating a sustained force to hold the screen protector to the screen surface 41. Also, the adsorption sheet 2 can quickly recover from elastic deformation and return to normal once detaches from the screen surface 41, enabling the screen protector to be installed and removed repeatedly. Meanwhile, static friction coefficient between the adsorption sheet 2 and the screen surface 41 is relatively large, which can generate considerable static friction that prevents the screen protector 100 from slipping away.

Moreover, the adsorption sheet 2 is very thin which leaves only a small distance between the functional film 1 and the screen 4, and thus will cause little interference to user input signals by hand touching or writing with pen-like accessories, and little interference on display performance by multiple reflections of light between the screen 4 and the functional film 1.

Furthermore, the functional film 1 may intrinsically have a permanent single-layer or multi-layer structure, each layer may be made of any of the following films: tempered glass film, normal glass film, ceramic film, sapphire film, TPU film, hydrogel film, normal plastic film, coated film, matte film, anti-fingerprint film, anti-glare film, anti-reflective film, low reflective film, transmittance-enhancing film, anti-peeping film, anti-blue light film, handwriting film, or paper-feel film.

Wherein, a normal plastic film helps prevent dirt and scratches; a tempered glass film or sapphire film or TPU film helps resist impact and wear; an anti-peeping film helps prevent people nearby from peeking at the user's screen 4; an anti-glare or matte or anti-reflective film helps reduce the interference of external light sources that may affect user viewing; a low reflective film helps reduce reflection of external light to the user's eyes; a transmittance-enhancing film enhances light transmission from the screen 4 to the user's eyes; an anti-blue light film helps filter out the light from the blue portion of the spectrum, which may be considered having negative biological effects on naked human eyes; a handwriting film or a paper-feel film renders the overly smooth original surface of the screen 4 with purpose-built roughness to improve user writing experience with a stylus.

Technically, the screen protector may be tailored with selected function(s) to suit any given usage scenario, either a simple scenario that requires only one specific function or a more complex scenario that requires a combination of multiple functions, making the overall solution widely applicable. In this case, almost any changing usage scenarios can be addressed by replacing with a detachable screen protector with matching functionalities.

Optionally, the front surface 11 of the functional film 1 may be electrostatically charged, generating electrostatic attraction between the functional film 1 and the screen surface 41.

Optionally, the surface on the second side 22 of the adsorption sheet 2 may be electrostatically charged, generating electrostatic attraction between the adsorption sheet 2 and the screen surface 41.

Technically, if the functional film 1 or the adsorption sheet 2 is an insulator, it can store static electricity generated by contact, friction or induction during production and usage; alternatively, if the functional film 1 or the adsorption sheet 2 is an electret, for example produced by polarization, particle accelerator injection, or high-voltage corona discharge, it may possess persistent static electricity. In both cases, the functional film 1 or the adsorption sheet 2 may be electrostatically charged, generating electrostatic attraction between itself and the screen surface 41, which can, to some extent, help maintain the screen protector's position at the beginning of installation and remove the air during installation, as well as provide additional adsorption force to help hold the screen protector more firmly to the screen 4 afterwards.

Furthermore, the first side 21 of the adsorption sheet 2 may be permanently fixed to the functional film 1 by bonding, solvent-dissolving connection, riveting, welding, or soldering.

More specifically, fixation of the adsorption sheet 2 to the functional film 1 may be set to be permanent at manufacturing, in order to prevent the adsorption sheet 2 falling apart from the functional film 1 during usage later. Also, welding/soldering may be achieved in one or more of the following ways: induction soldering, hot-plate soldering, hot-gas soldering, ultrasonic welding, laser soldering, hot-wire welding.

Furthermore, permanent fixation of the adsorption sheet 2 to the functional film 1 may involve bonding with the use of optically clear adhesives (OCA). More specifically, the OCA may be applied on the contact surfaces between the adsorption sheet 2 and the functional film 1.

Technically, the OCA is colorless and transparent with high light transmittance, therefore when the functional film 1 is transparent or translucent, the use of OCA can avoid interference such as Newton's rings on the bonding surface, making the product flatter and aesthetically more appealing.

Furthermore, the functional film 1 is transparent or translucent.

Technically, since the functional film 1 is transparent or translucent, the display of the screen 4 can be viewed by the user through the screen protector after installation.

In short, this new type of detachable screen protector is capable of being installed and removed easily and repeatedly, and solves the following technical problems of the related art: insufficient strength of attachment to the screen 4, significant decay of attachment strength over time, inconvenient position adjustment during installation, troubles of sticking objects other than target device during installation, difficulty in cleaning, as well as using adsorption/adhesion structures that easily makes damages or marks during installation or removal. For that reason, it can offer better user experience compared to existing solutions.

The present disclosure also includes a detachable and composable screen protector, capable of being installed and removed easily and repeatedly, as well as flexibly altering its functionalities through de-composition and re-composition while in use. It has a non-permanent multi-layer structure that comprises N layers, each layer is attached to its previous layer except for the first layer which attaches directly to the screen 4. Each layer may be installed and removed separately, and comprises a functional film 3 and at least one adsorption sheet 2. Each functional film 3 comprises a front surface 31 facing towards the screen 4 and a back surface 32. Each adsorption sheet 2 has a first side 21 that is permanently fixed to the front surface 31 in a margin area 2', of the functional film 3 in the same layer.

During installation, the front surface 31 of the functional film in the first layer 3*a* is placed on the surface of the screen 4; then from the second to the Nth layers, the front surface 31 of the functional film 3 in each layer is placed on top of the back surface 32 of the functional film 3 in the previous layer. For each layer, by directly or indirectly pressing on the back surface 32 of the functional film 3 around the area above the adsorption sheet(s) 2, the air between the adsorption sheet(s) 2 and the functional film 3 in the previous layer or the screen surface 41 will be removed, and the current layer is then attached to the previous layer or the screen 4.

Afterwards, by refilling air in between the adsorption sheet(s) 2 and the previous layer or the screen 4, each individual layer or the overall screen protector may be easily detached for re-use later.

Technically, after removing the air, a hermetically sealed low pressure or vacuum area will be formed in the space between the contact surfaces of the adsorption sheet(s) 2 in each layer and the functional film 3 in the previous layer or the screen 4. In this case, the air pressure difference between the hermetically sealed low pressure or vacuum area and the atmosphere 5 generates a strong force, which holds the layers together and pushes the screen protector to the screen surface 41, with enough friction to prevent each layer and the overall screen protector from slipping away during user writing or performing other tasks on the device. After refilling air in between the contact surfaces between the layers or between the screen protector and the screen 4, for example by making a small gap using a fingernail, the air pressure difference quickly drops to almost zero, making each layer or the screen protector easily detachable.

In this case, each layer and the overall screen protector can be installed and removed easily and repeatedly without the need of extra tools, and any set of individual functions can be easily combined to serve a given usage scenario, either simple or more complex. Meanwhile when the usage scenario changes, the screen protector may be easily de-composed and re-composed with a different set of functional films that match the new purpose.

Since the screen protector does not use adhesives, this solution has three advantages: 1. the adsorption capacity does not reduce over time, as dust and particles in the environment will not stick to the surface of the adsorption sheet(s) 2, and each individual layer as well as the overall screen protector can be easily cleaned by normal cleaning methods in case some dirt gathered on their surfaces; 2. no damages or marks will be left on the surfaces of each layer or the screen 4 after repeatedly attaching and detaching from each other; 3. when the adsorption sheet(s) 2 initially contacts the surface of the screen 4 or the functional film 3 in the previous layer, there will be no adsorption force until pressing the back surface 32 of the functional film 3 in the current layer to remove the air, thereby each individual layer and the overall screen protector can be easily adjusted to the correct position before making attachment.

In addition, since the screen protector does not resort to magnetism for attachment, it does not require the screen 4 or the device containing the screen 4 to have permanent magnets or soft magnetic materials inside or underneath it, and meanwhile will not be pulled away by magnetic accessories of the device, or other magnetic objects in the environment.

Furthermore, for each layer from the first to the (N−1)th layers, the functional film 3 comprises a smooth region on its back surface 32, corresponding to the position of each adsorption sheet 2 in the next layer.

Technically, the smooth regions will cover the contact surfaces between any two consecutive layers, and can enhance the formation of the hermetically sealed low pressure or vacuum areas, helping to maintain the air pressure difference with the atmosphere 5, and in turn facilitating attachment between the layers.

Furthermore, the primary material of the adsorption sheet 2 is elastic polymer. More specifically, the adsorption sheet 2 may be made of any of the following materials: rubber, silicone rubber, silicone resin, thermoplastic elastomers (TPE), thermoplastic polyurethanes (TPU), soft polyvinyl chloride (PVC), thermoplastic hydrogel (TPH), polyurethane (PU) and polyethylene terephthalate (PETE).

Technically, the adsorption sheet 2 made of elastic polymer is able to be elastically deformed during installation and fit perfectly to the surface of the functional film 3 in the previous layer or the screen 4, filling tiny gaps in between and form a hermetically sealed flat area. In this case, air pressure difference between the hermetically sealed flat area and the atmosphere 5 can last over a long time, and generates a sustained force to hold the layers together and the screen protector to the screen surface 41. Also, the adsorption sheet 2 can quickly recover from elastic deformation and return to normal once detaches from the previous layer or the screen surface 41, enabling each individual layer and the overall screen protector to be installed and removed repeatedly. Meanwhile, static friction coefficients between the adsorption sheets and the surfaces of functional films or the screen 4 is relatively large, and can generate considerable static friction that prevents each individual layer and the overall screen protector from slipping away.

Moreover, the adsorption sheet 2 is very thin which leaves only small distances between the layers as well as between the screen protector and the screen 4, and thus can significantly reduce the interference to user input signals by hand touching or writing with pen-like accessories, and the interference on display performance by multiple reflections of light between the screen 4 and the functional films in different layers.

Furthermore, the functional film 3 may intrinsically have a permanent single-layer or multi-layer structure, each layer may be made of any of the following films: tempered glass film, normal glass film, ceramic film, sapphire film, TPU film, hydrogel film, normal plastic film, coated film, matte film, anti-fingerprint film, anti-glare film, anti-reflective film, low reflective film, transmittance-enhancing film, anti-peeping film, anti-blue light film, handwriting film, or paper-feel film.

Technically, each individual layer may contain a single or multiple functions. In a complex usage scenario that requires a larger number of functions, composing an overall solution with some multi-functional layers may be more efficient than merely with single-functional layers, and meanwhile reduce the total number of layers, further enhancing the overall structural stability and light penetration through the screen protector.

Optionally, the front surface 31 of the functional film 3 in any layer may be electrostatically charged, generating electrostatic attraction between itself and the screen surface 41 as well as functional films in other layers.

Optionally, the surface on the second side 22 of the adsorption sheet 2 in any layer may be electrostatically charged, generating electrostatic attraction between itself and the screen surface 41 as well as functional films in other layers.

Technically, if the functional film 3 or the adsorption sheet 2 in any layer is an insulator, it can store static electricity generated by contact, friction, or induction during production and usage; alternatively, if the functional film 3 or the adsorption sheet 2 is an electret, for example produced by polarization, particle accelerator injection, or high-voltage corona discharge, it may possess persistent static electricity. In both cases, the functional film 3 or the adsorption sheet 2 may be electrostatically charged, generating electrostatic attraction between itself and the screen 4 as well as other layers, which can, to some extent, help maintain the position of each individual layer or the overall screen protector at the beginning of installation, help remove the air during installation, as well as provide additional adsorption force to help hold the layers together and the screen protector to the screen 4 more firmly afterwards.

Furthermore, the first side 21 of the adsorption sheet 2 in each layer may be permanently fixed to the functional film 3 by bonding, solvent-dissolving connection, riveting, welding, or soldering.

More specifically, fixation of the adsorption sheet 2 to the functional film 3 may be set to permanent at manufacturing in order to prevent the adsorption sheet 2 falling apart from the functional film 3 during use. Also, welding/soldering may be achieved in one or more of the following ways: induction soldering, hot-plate soldering, hot-gas soldering, ultrasonic welding, laser soldering, hot-wire welding.

Furthermore, permanent fixation of the adsorption sheet 2 to the functional film 3 may involve boding with the use of OCA. More specifically, the OCA may be applied in the contact surfaces between the adsorption sheet 2 and the functional film 3.

Technically, since the OCA is colorless and transparent with high light transmittance, when the functional film 3 is transparent or translucent, the use of OCA can avoid interference such as Newton's rings on the bonding surface, making the product flatter and aesthetically more appealing.

Furthermore, the functional film 3 in each layer is transparent or translucent.

Technically, since the functional film 3 in each layer is transparent or translucent, the display of the screen 4 can be viewed by the user through the functional films after installation.

In short, this detachable and composable screen protector is capable of being installed and removed easily and repeatedly, as well as flexibly altering its functionalities through de-composition and re-composition with a new set of functional films to cater for circumstances with complex changing usage scenarios, without going through re-manufacturing or the use of extra tools.

Detailed Embodiment 1: A Detachable Anti-Peeping Screen Protector 100

An anti-peeping screen protector (also known as anti-peep, anti-peek, anti-peeking or anti-spy screen protector), for example, can lower screen brightness when viewing from the side. It typically has a viewing angle of 30-45 degrees: the higher the angle, the darker the screen 4, with the screen 4 turning totally black beyond the viewing angle. It prevents others from peeking at the user's screen 4, protecting privacy in public space. However, it also to some extent lowers screen brightness viewing from the front, somewhat lowering viewing experience.

Figure 11:
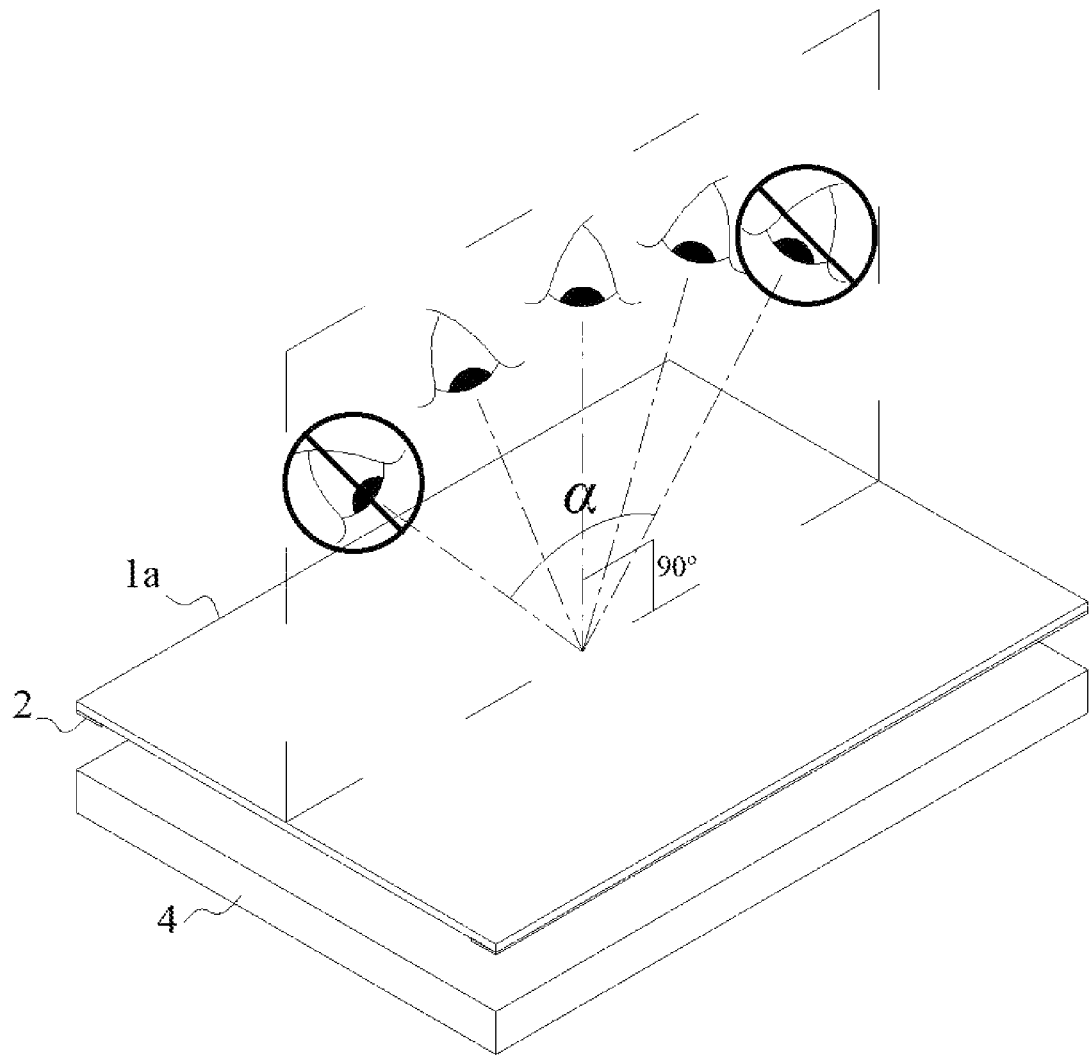
FIG. 11 is a schematic diagram of the detachable anti-peeping screen protector in Embodiment 1.
Figure 12:
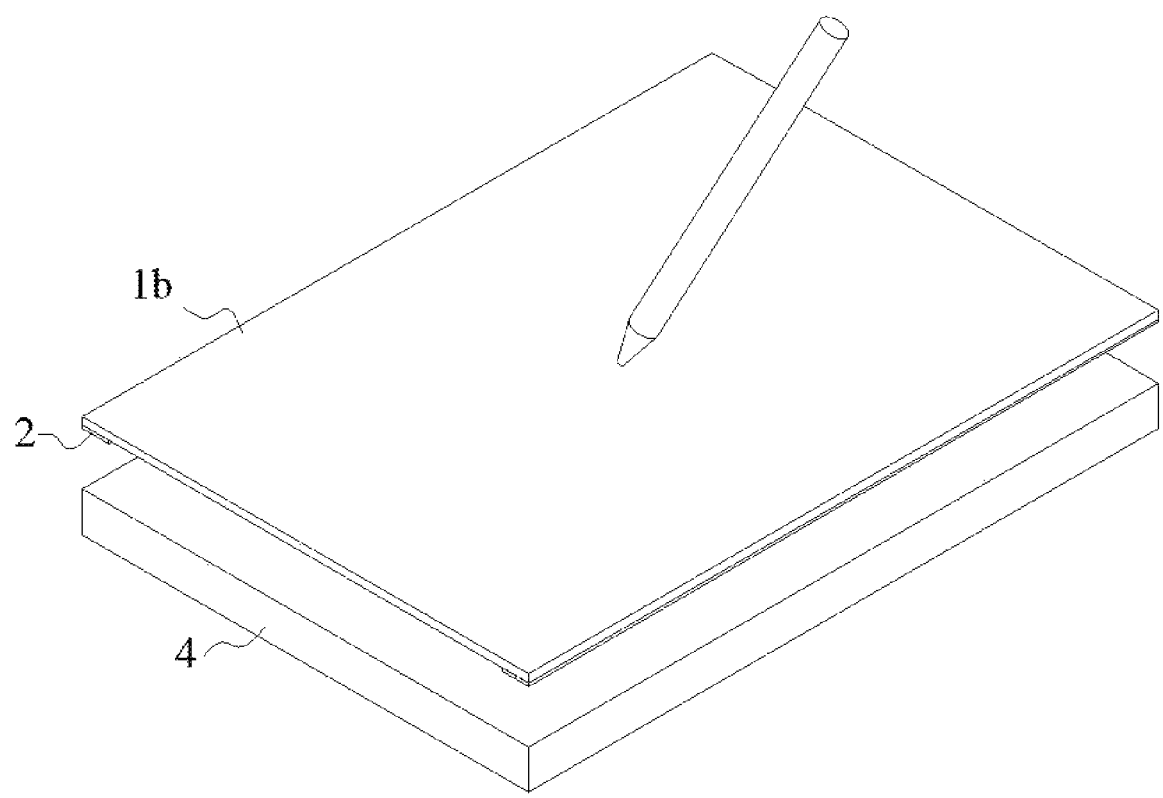
FIG. 12 is a schematic diagram of the detachable paper-feel screen protector in Embodiment 2.
Figure 13:
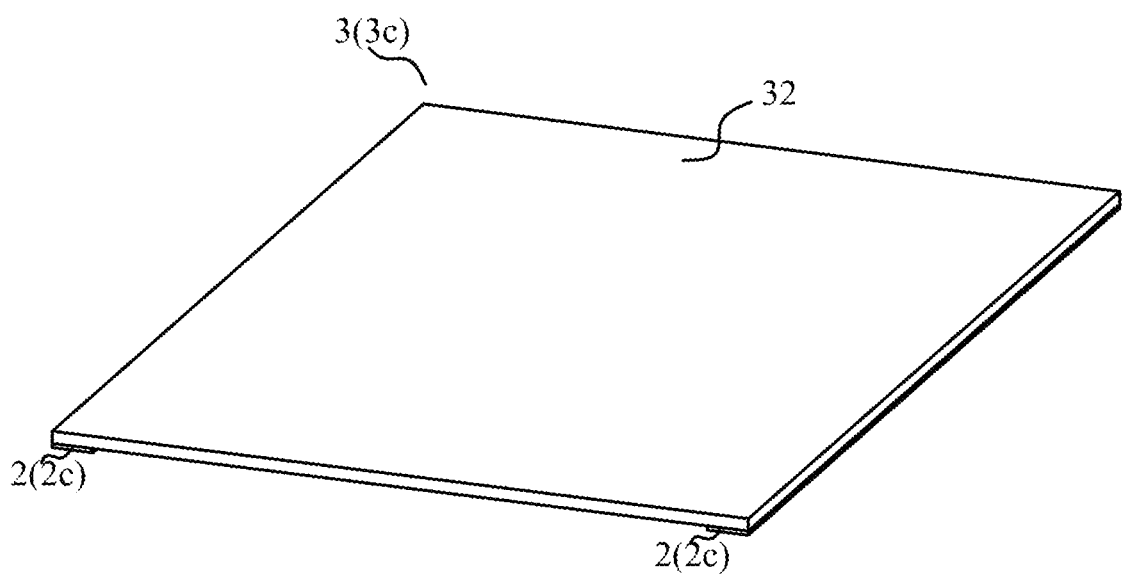
FIG. 13 is a schematic diagram of the third layer of the detachable and composable screen protector in Embodiment 3.
Figure 14:
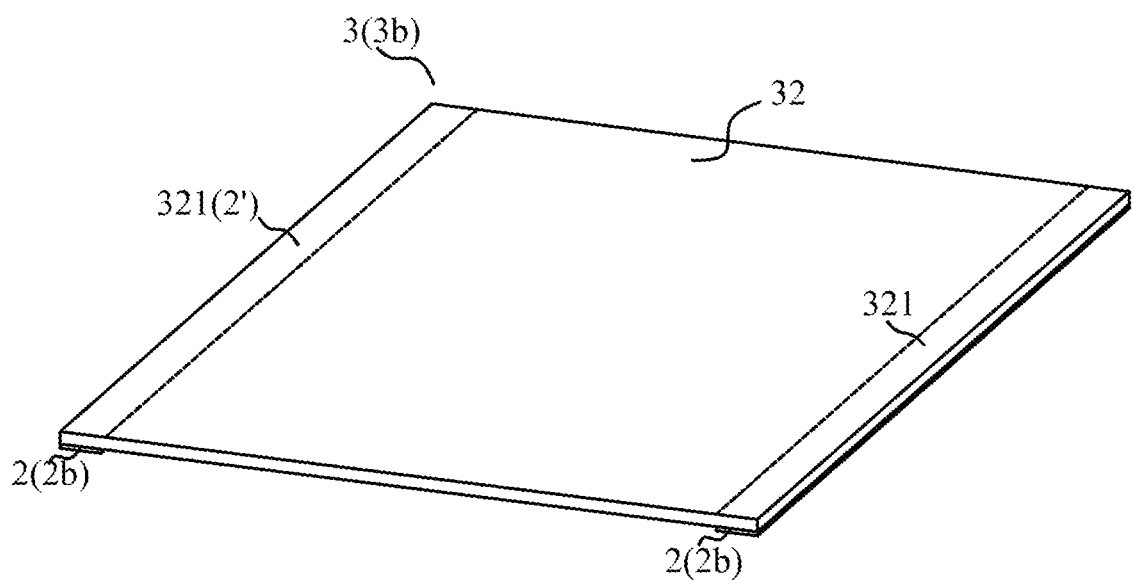
FIG. 14 is a schematic diagram of the second layer of the detachable and composable screen protector in Embodiment 3, with two smooth regions on the back surface of the functional film in the margin area.
Figure 15:
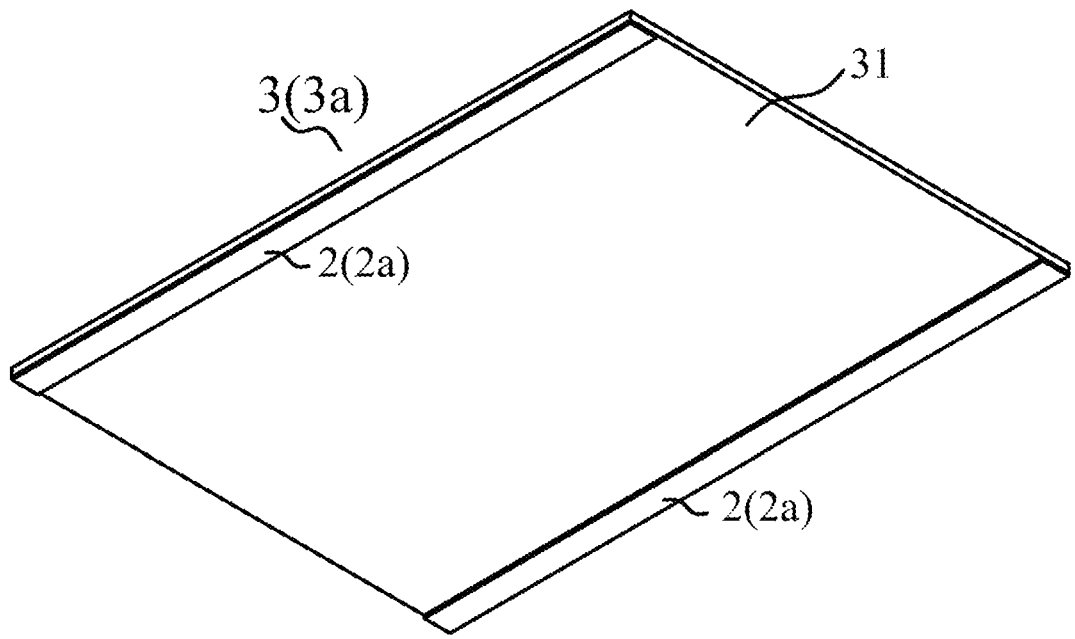
FIG. 15 is a schematic diagram of the first layer of the detachable and composable screen protector in Embodiment 3, with two adsorption sheets installed on the front surface of the functional film in the margin area.
Figure 16:
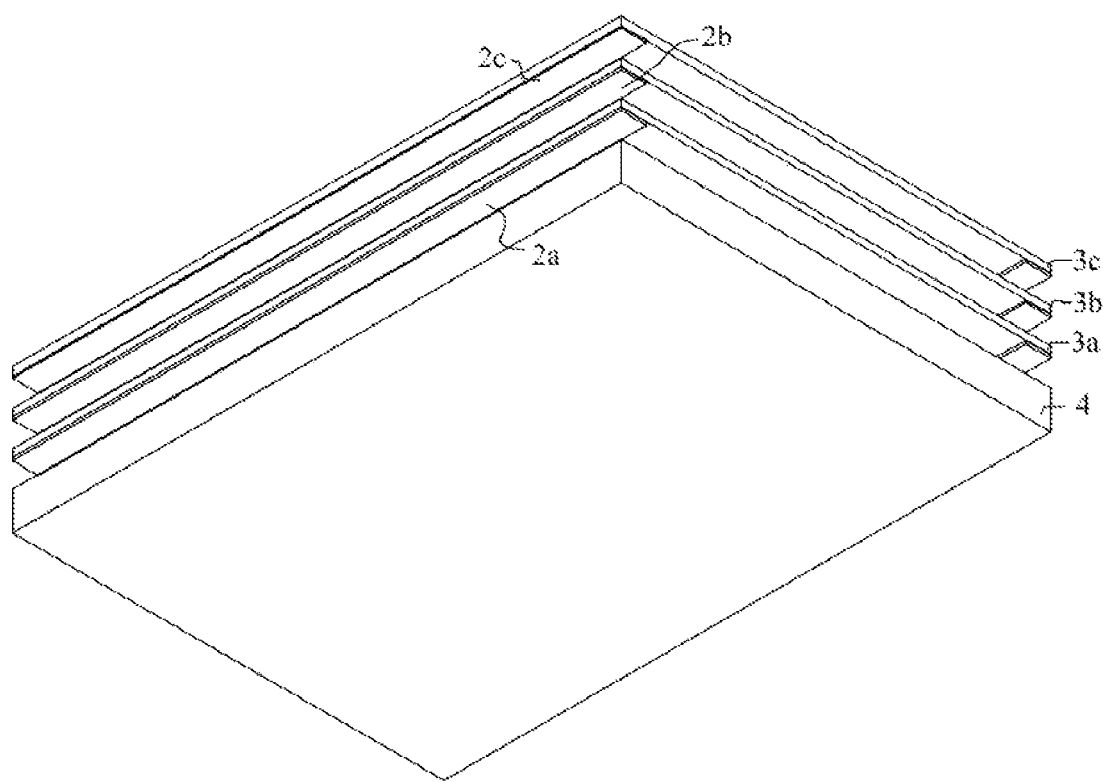
FIG. 16 is a schematic diagram of the detachable and composable screen protector in Embodiment 3 in a status that the three layers are not attached to each other and the screen protector is not attached to the screen.
Figure 17:
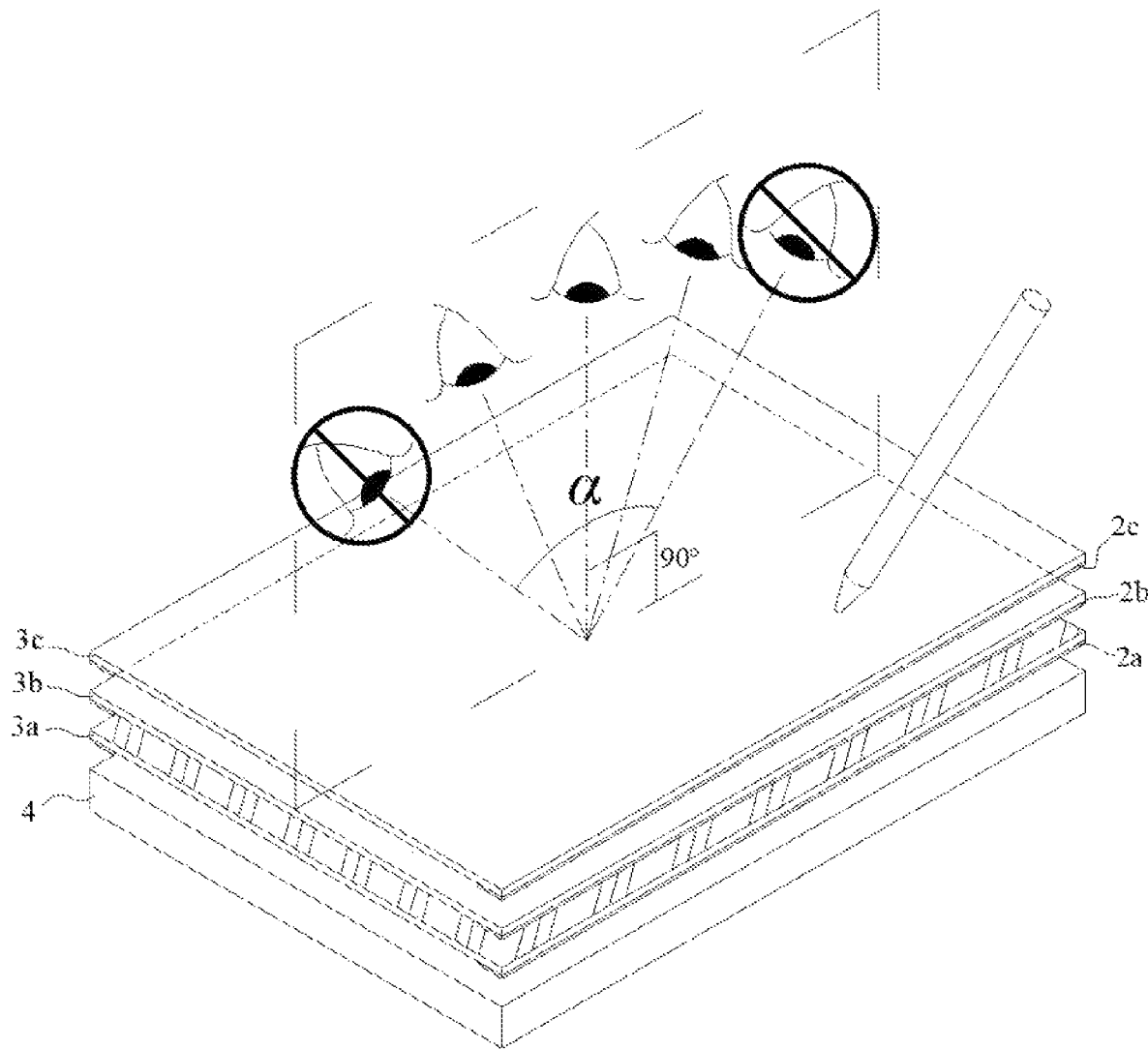
FIG. 17 is a schematic diagram of the detachable and composable screen protector in Embodiment 3 where the functional films in the first, second and third layers are respectively a tempered glass film, an anti-peeping film, and a paper-feel film.
Figure 18:
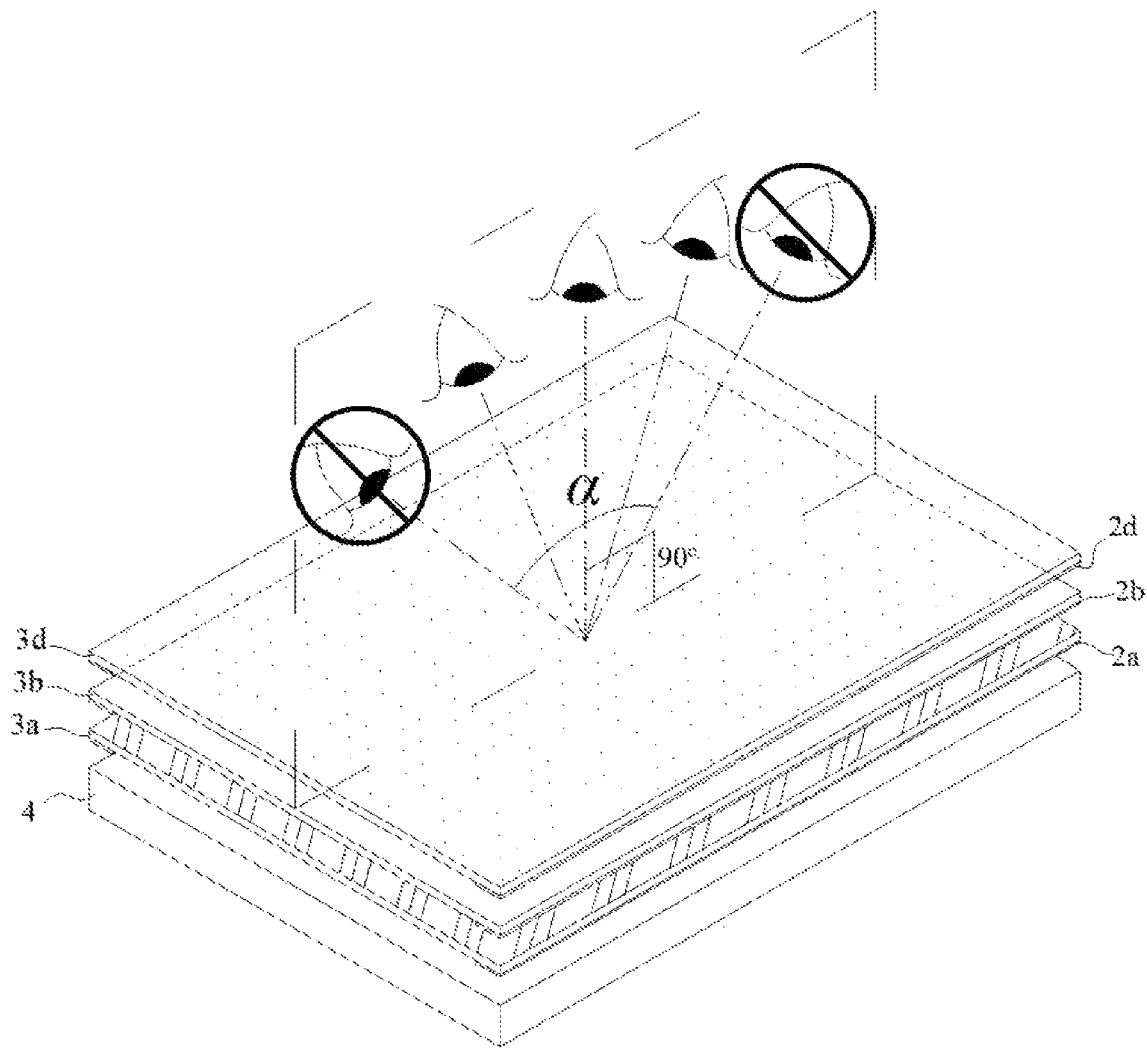
FIG. 18 is a schematic diagram of the detachable and composable screen protector in Embodiment 3 where the functional films in the first and second layers are still a tempered glass film and an anti-peeping film, whereas the one in the third layer is replaced with an anti-glare film.

As shown in FIGS. 1-5, this embodiment discloses a detachable anti-peeping screen protector 100 that is capable of being installed and removed easily and repeatedly, which comprises a functional film 1 and two adsorption sheets 2 made of Soft PVC with a thickness of 0.13 mm. As shown in FIG. 11, the function film 1 includes a first anti-peeping film 1a, which is installed on the surface of the screen 4; when viewing from within the viewing angle $\alpha=50°$, the anti-peeping film has very small impact on the brightness of screen display; but when viewing from beyond the viewing angle, the anti-peeping film will sharply reduce screen brightness until turning it completely black, rendering the display content unviewable. The functional film 1 comprises a front surface 11 facing towards the screen 4 and a back surface 12 wherein, the adsorption sheets 2 are permanently fixed, by ultrasonic welding, to the front surface 11 in the margin area 2'. Adsorption sheet 2 comprises a first side 21 that is permanently fixed to the front surface 11 of the functional film 1 in a margin area 2', and a second side 22 of each adsorption sheet 2 contacts the surface 41 of the screen 4, and by pressuring on the back surface 12 of the functional film 1 in the area above the adsorption sheets 2, the air between each adsorption sheet 2 and the screen surface 41 will be squeezed out, forming a hermetically sealed low-pressure or vacuum area. In this case, the air pressure difference between the hermetically sealed low-pressure or vacuum area and the atmosphere 5 generates a strong force, which pushes the entire screen protector 100 to the screen surface 41. Meanwhile, the static friction coefficient between the adsorption sheets 2 and the screen surface 41 is relatively large due to the nature of the materials in use, therefore generates considerable static friction that prevents the screen protector 100 from slipping away. During writing on the screen 4 over the screen protector 100, the user's hands and/or the stylus may generate a lateral force, but it is most likely much lower than the upper limit of the aforementioned static friction coefficient force, therefore the screen protector 100 will most likely stay firmly in position.

Optionally, the functional film 1 and the adsorption sheet 2 may be made insulators that store static electricity generated by contact, friction and induction during production and usage; or electrets that possess persistent electrostatic electricity. In this case, the function film 1 and the adsorption sheets 2 may be electrostatically charged, generating electrostatic attraction between the screen protector 100 and the screen surface 41, which can, to some extent, help maintain the screen protector 100's position at the beginning of installation and remove the air during installation, as well as provide additional adsorption force to help hold the screen protector 100 more firmly to the screen 4 afterwards Optionally, when the screen device contains permanent magnets or soft magnetic materials, additional permanent magnets or soft magnetic materials can be added to the functional film 1, or to the adsorption sheets 2, or between them, or onto the front surface 11 or the back surface 12. This can generate additional magnetic attraction between the screen protector 100 and the screen device, which can, to some extent, help maintain the screen protector 100's position at the beginning of installation and remove the air during installation, as well as provide additional adsorption force to help hold the screen protector 100 more firmly to the screen 4 afterwards.

Permanent magnets refer to materials that can generate magnetic fields for a long period of time, including but not limited to rare earth permanent magnet materials (for example neodymium iron boron, samarium cobalt, alnico, iron nitrogen), metal permanent magnet materials (for example alnico alloy, ferrochrome cobalt alloy), ferrite permanent magnet materials, and composite permanent magnet materials.

Soft magnetic materials refer to materials that can be easily magnetized in external magnetic fields, including but not limited to stainless iron, pure iron, low carbon steel, iron-silicone alloys, iron-aluminum alloys, iron-silicone aluminum alloys, nickel-iron alloys, cobalt-iron alloys, soft magnetic ferrites, amorphous soft magnetic alloys, and super-microcrystalline soft magnetic alloys.

Figure 6:
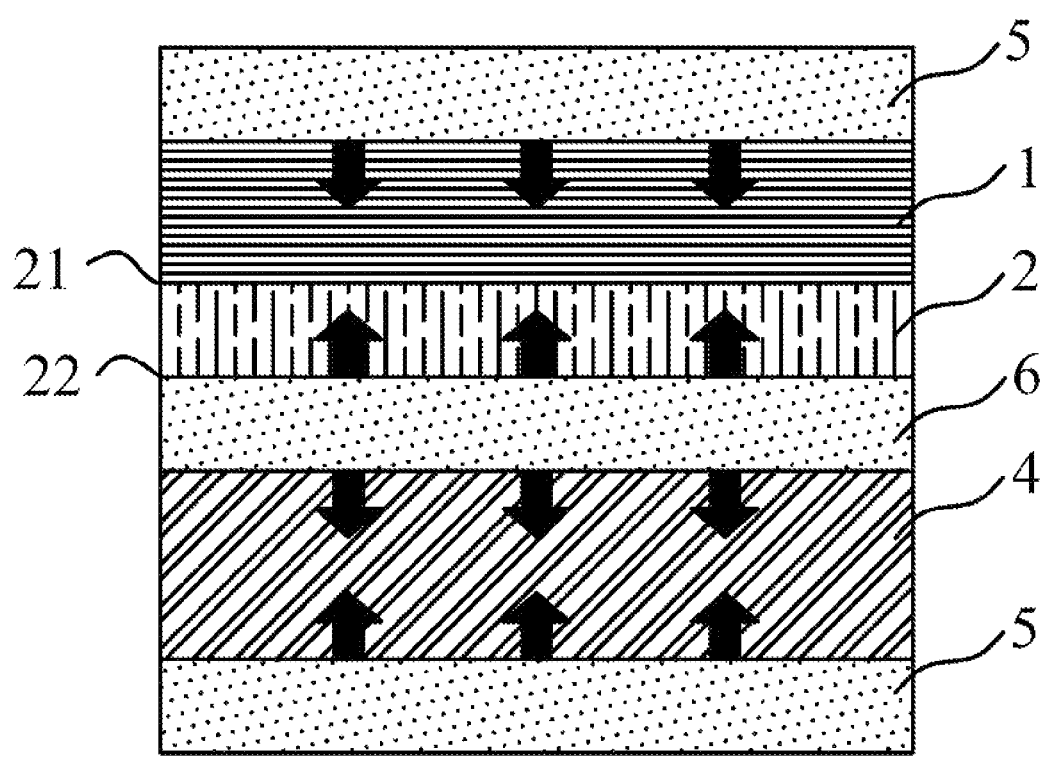
FIG. 6 is a schematic diagram that illustrates the structural mechanics of the detachable screen protector in Embodiment 1 and Embodiment 2 before installation.

Before installation, as shown in FIG. 6, the air pressure of the atmosphere 5 is the same as the air pressure in the space pending air removal 6, thus the forces pushing the functional film 1 and the adsorption sheet 2 upwards and downwards cancel each other out.

Figure 7:
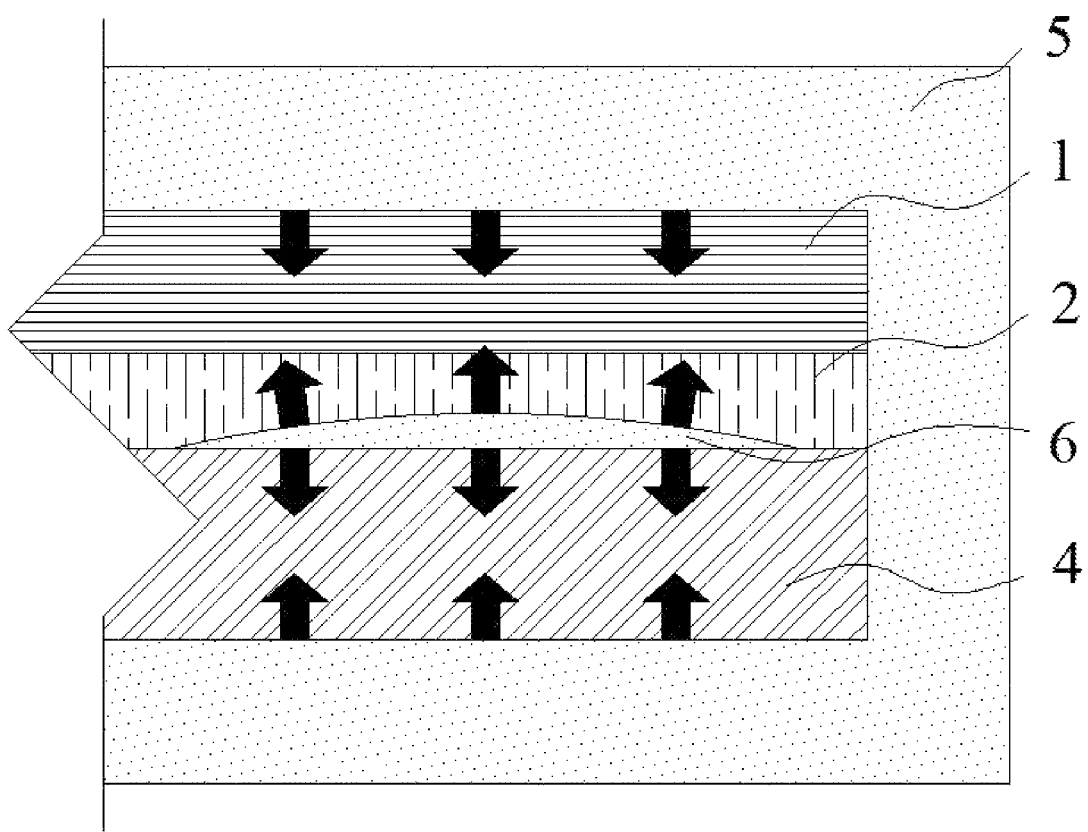
FIG. 7 is a schematic diagram that illustrates the structural mechanics of the detachable screen protector in Embodiment 1 and Embodiment 2 at the beginning of installation.

Then at the beginning of installation, as shown in FIG. 7, when the adsorption sheet 2 initially contacts the screen 4, the space pending air removal 6 still exists and maintains an equal level of air pressure to the atmosphere 5, thus continues to cancel out the forces pushing upwards and downwards. In this case, the screen protector 100 is not yet attached to the screen 4.

Figure 8:
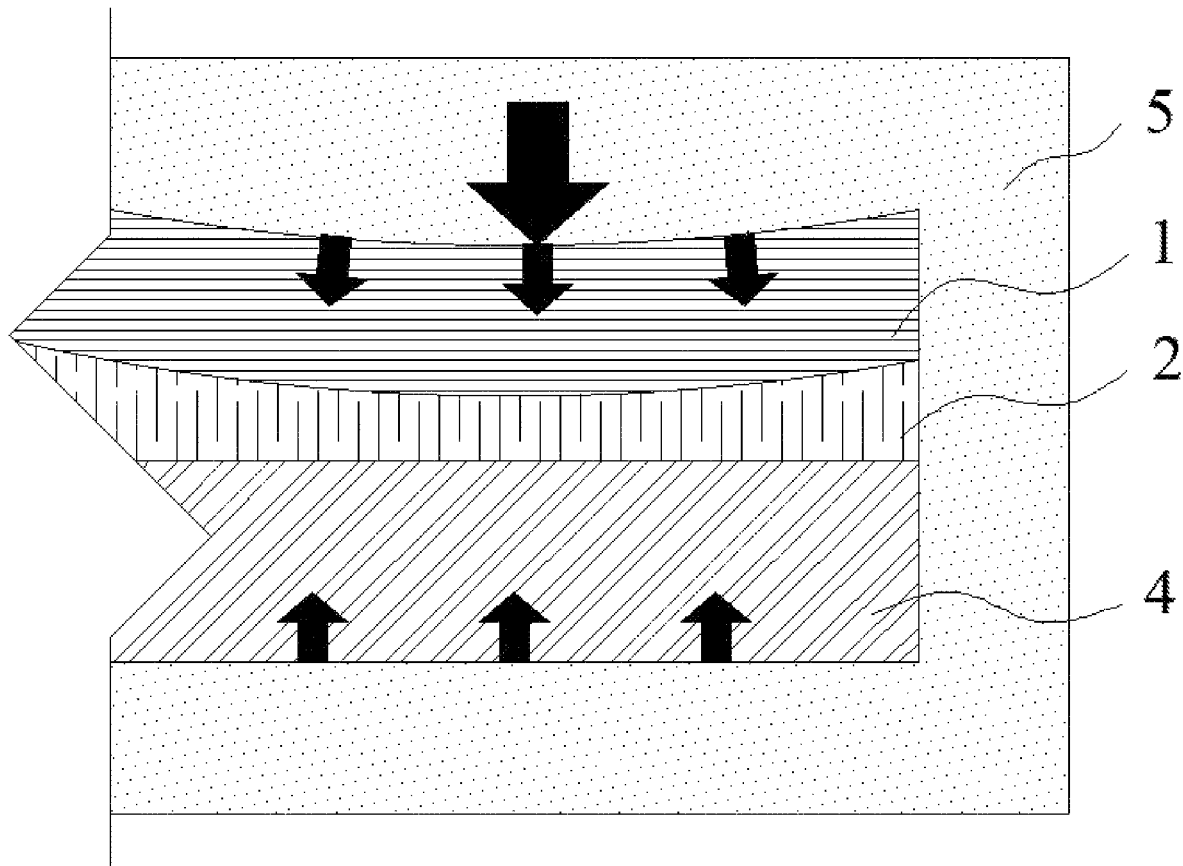
FIG. 8 is a schematic diagram that illustrates the structural mechanics of the detachable screen protector in Embodiment 1 and Embodiment 2 during installation.

During installation, as shown in FIG. 8, by pressing the back surface 12 of the functional film 1, the air in the space pending air removal 6 will be squeezed out, turning its air pressure much lower than the atmosphere. The air pressure difference with the atmosphere then generates a strong force pushing the screen protector 100 downwards, attaching it to the screen 4.

Figure 9:
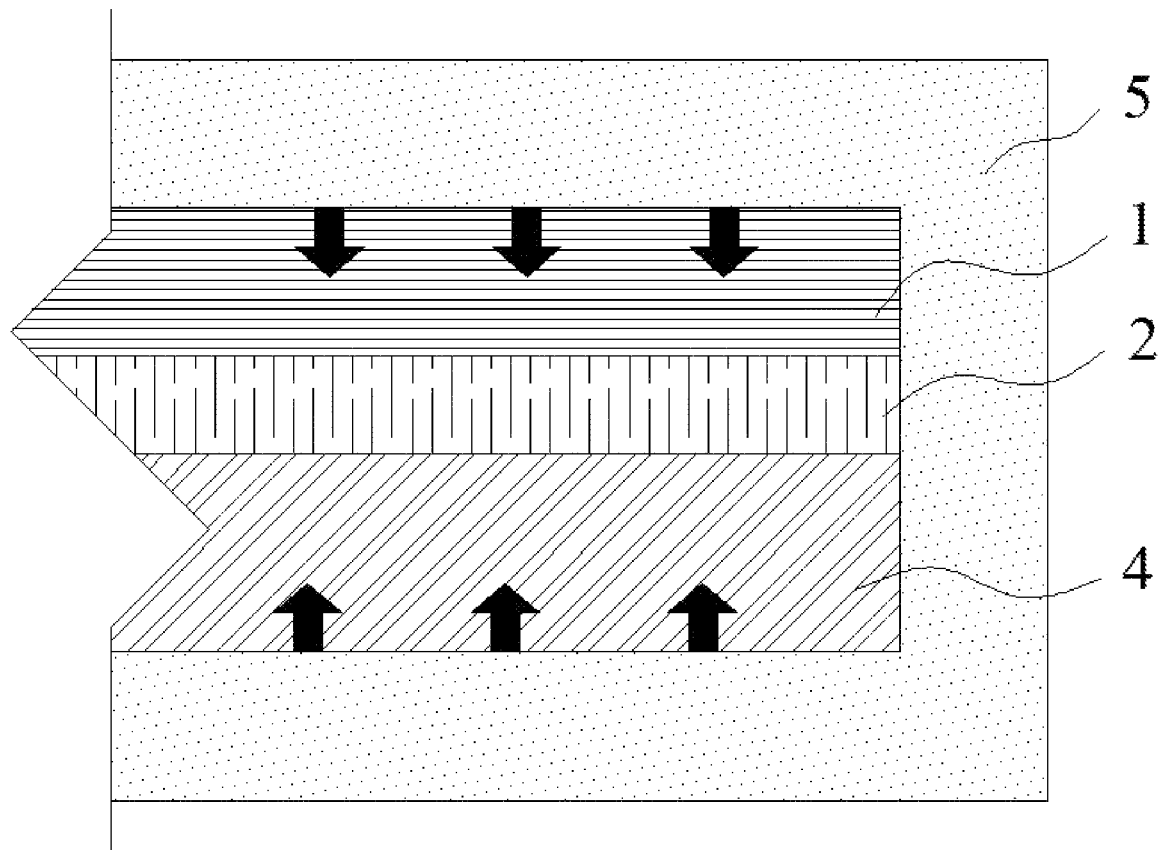
FIG. 9 is a schematic diagram that illustrates the structural mechanics of the detachable screen protector in Embodiment 1 and Embodiment 2 after installation.

After installation, as shown in FIG. 9, since the adsorption sheet 2 is made of Soft PVC and is elastic, it can fit to the screen surface 41 perfectly and turn the contact surfaces between the adsorption sheet 2 and the screen surface 41 into a hermetically sealed low-pressure or vacuum area that lasts over time, maintaining the air pressure difference with the atmosphere 5 and the adsorption force to attach the screen protector 100 to the screen 4. Furthermore, due to the nature of these materials, the static friction coefficient between the adsorption sheet 2 and the screen surface 41 is relatively large, so can the static friction force be in case of a lateral force trying to drag the screen protector 100 away.

Figure 10:
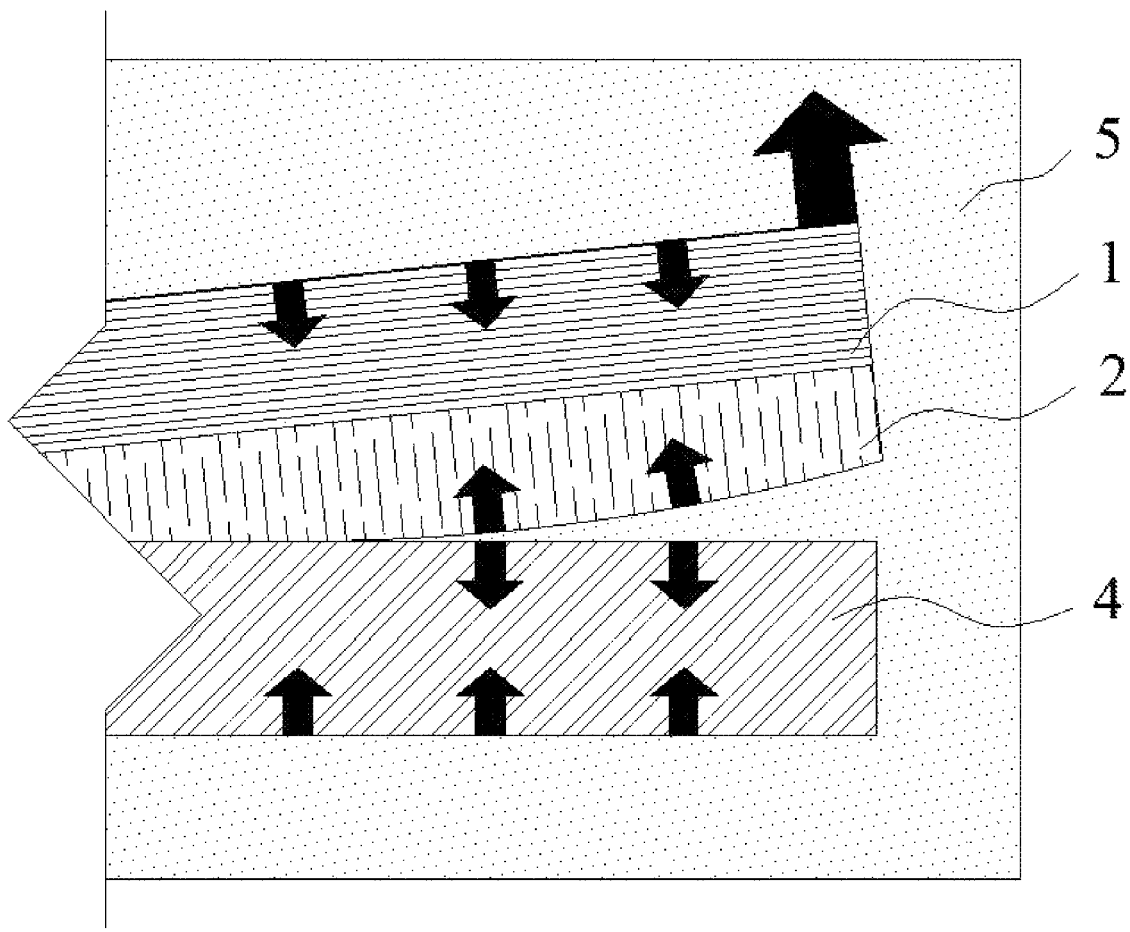
FIG. 10 is a schematic diagram that illustrates the structural mechanics of the detachable screen protector in Embodiment 1 and Embodiment 2 during removal.

During removal, as shown in FIG. 10, an external force must be applied to make a gap between the contact surfaces of the adsorption sheet 2 and the screen 4, for example by inserting a fingernail, which then lets in the air and quickly drops the air pressure difference with the atmosphere 5 to almost zero, cancelling out the adsorption force and detaching the screen protector 100 from the screen 4.

Detailed Embodiment 2: A Detachable Paper-Feel Screen Protector 100

A paper-feel screen protector (also known as paper feel, paper like, or paper-like screen protector) is a special type of film with purpose-built roughness and texture on the surface that can simulate the friction and touch of paper, so that, when installed, the experience of writing/drawing on the screen 4 with a stylus is close to writing/drawing on real paper with a pen. However, it also somewhat lowers viewing experience with less screen 4 clarity.

As shown in FIGS. 1-10 and 12, this embodiment discloses a detachable paper-feel screen protector 100 that is capable of being installed and removed easily and repeatedly, which comprises a functional film 1 and two adsorption sheets 2 made of TPU with a thickness of 0.12 mm. The functional film 1 includes a paper-feel film with purpose-built roughness and texture that simulates the friction and touch of paper, which when installed, makes the experience of writing/drawing on the screen 4 with a stylus (or other similar pen-like accessories) close to that of writing/drawing on real paper with a pen. The functional film 1 comprises a front surface 11 facing towards the screen 4 and a back surface 12 the screen 4, wherein, the adsorption sheets 2 are permanently fixed, using OCA Adhesives, to the front surface 11 in the margin area 2'.

Other features including the use of optional structures are similar to Embodiment 1; the physics and technical effects at the stages of pre-installation, during installation, post-installation as well as at removal are also similar to Embodiment 1, and are thereby skipped here.

Detailed Embodiment 3: A Detachable and Composable Anti-Peeping Paper-Feel Tempered-Glass Screen Protector 100

As shown in FIGS. 5 and 13 to 18, Embodiment 3 discloses a detachable and composable screen protector 100 that is capable of being installed and removed easily and repeatedly, as well as flexibly altering its functionalities through de-composition and re-composition. It has a non-permanent three-layer structure, wherein the first layer comprises a functional film 3 made of a tempered glass film and two adsorption sheets 2a made of TPU; the second layer comprises a functional film 3b made of an anti-peeping film and two adsorption sheets 2b made of TPU; and the third layer comprises a functional film 3c made of a paper-feel film and two adsorption sheets 2c made of TPU. For each layer, the functional film 3 comprises a front surface 11 facing towards the screen 4 and a back surface 12; and the adsorption sheets are permanently fixed, using OCA Adhesives, to the front surface 11 in the margin area 2'; moreover on the back surface 12 there are two smooth regions 321 that correspond to the locations of adsorption sheets, in order to facilitate attachment with adsorption sheets in the next layer.

In a standard use case, the third layer is attached to the second layer, and the second layer in turn is attached to the first layer, which is then attached directly to the screen 4. More specifically, the adsorption sheets 2a, 2b, 2c in the first, second and third layer respectively contact the screen surface 41, and the smooth regions 321 in the first and second layers. Then by pressing on the back surface 12 of each layer in the area above the adsorption sheets 2a/2b/2c, either directly or indirectly, the air between each adsorption sheet 2a/2b/2c and the screen surface 41 or the smooth region 321 on the back surface 12 in the previous layer will be squeezed out, forming a hermetically sealed low-pressure or vacuum area. In this case, the air pressure difference between the hermetically sealed low-pressure or vacuum area and the atmosphere 5 generates a strong force, which holds all the layers together and pushes the entire screen protector 100 to the screen surface 41. Meanwhile, the static friction coefficient between the adsorption sheets 2a/2b/2c and the screen surface 41 or the smooth regions 321 in the previous layer is relatively large due to the nature of the materials in use, therefore generates considerable static friction that prevents each layer and the overall screen protector 100 from slipping away. During writing on the screen 4 over the screen protector 100, the user's hands and/or the stylus may generate a lateral force, but it is most likely much lower than the upper limit of the aforementioned static friction force, therefore each layer and the screen protector 100 will most likely stay firmly in position.

Alternatively, each layer may be attached and detached separately, making the screen protector 100 easily composable. For example, by removing the second layer and attaching the third layer directly to the first layer, it turns into a paper-feel tempered-glass screen protector 100, which no longer prevents prying eyes viewing from the side but meanwhile avoids diminishing screen brightness, and retains its overall capacity of damage protection and paper-feel writing experience. Likewise, removing the first layer turns it into an anti-peeping paper-feel screen protector 100 that may be more fragile and vulnerable to shocks. Furthermore, additional layers comprising different types of functional films, such as anti-blue light or ceramic films, may be added to or replace the existing layers of the structure to further alter its functionalities. In short, the screen protector 100 may be installed and removed easily and repeatedly, while its layers may be equally detachable in its own right, making the overall solution easily composable, flexibly altering its functionalities to cater for complex changing usage scenarios.

Figure 19:
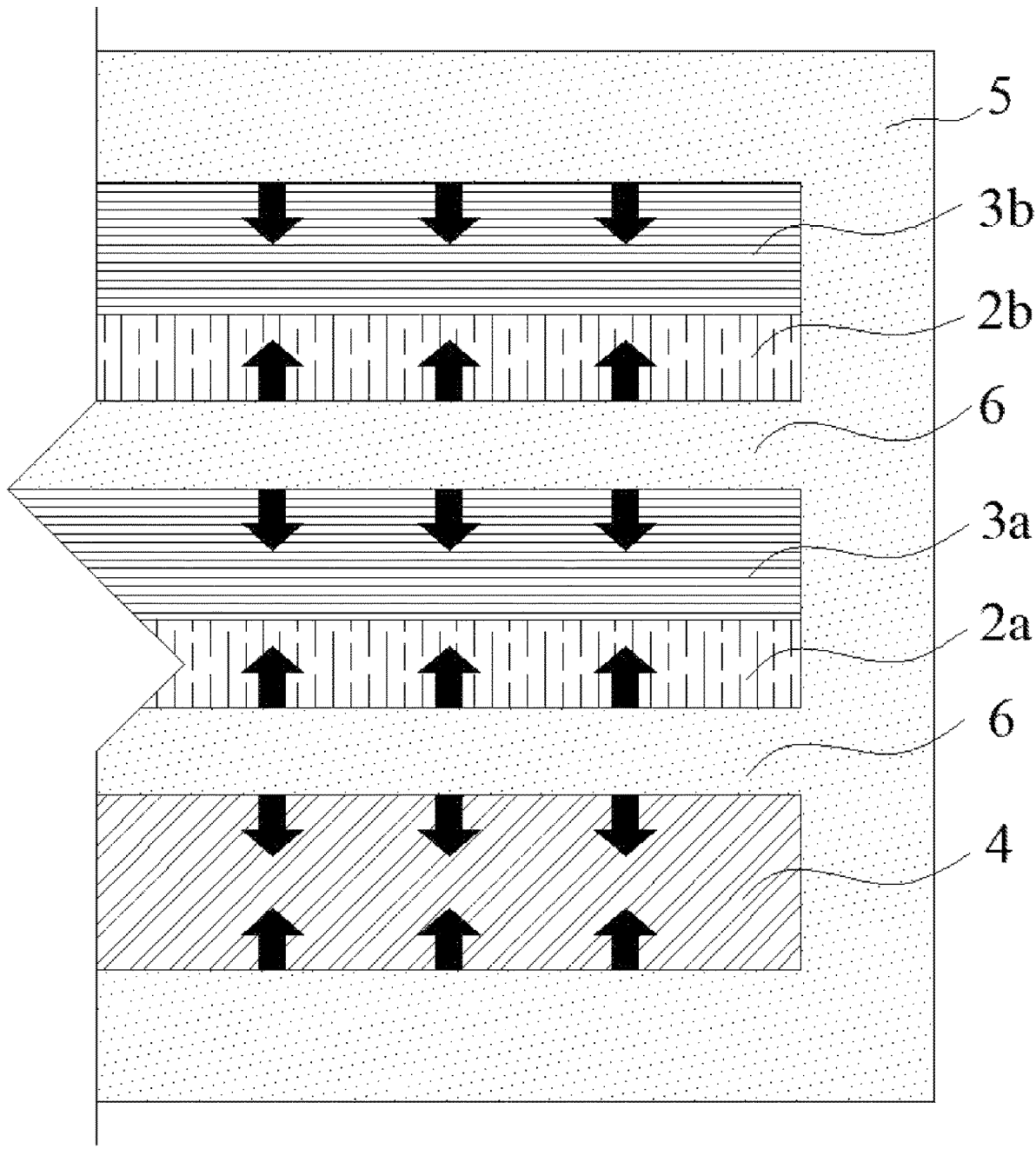
FIG. 19 is a schematic diagram that illustrates the structural mechanics of the first and second layers in the detachable and composable screen protector in Embodiment 3 before installation.

Before installation, as shown in FIG. 19, the air pressure of the atmosphere 5 is the same as the air pressure in the space pending air removal 6, thus the forces pushing the functional film 3a/3b downwards and the adsorption sheet 2a/2b upwards cancel each other out.

Figure 20:
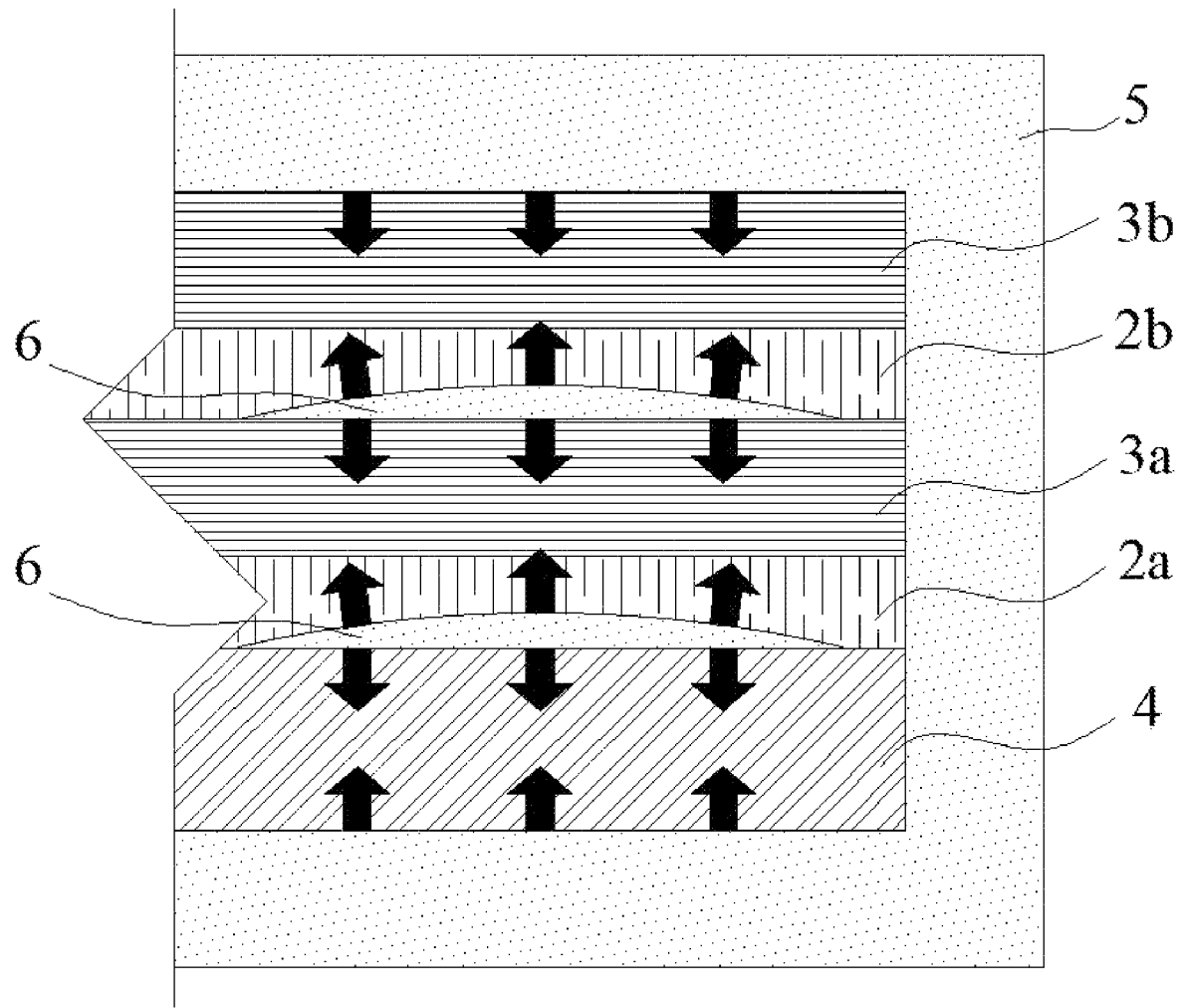
FIG. 20 is a schematic diagram that illustrates the structural mechanics of the first and second layers in the detachable and composable screen protector in Embodiment 3 at the beginning of installation.

Then at the beginning of installation, as shown in FIG. 20, when the adsorption sheet 2a and 2b initially contact the screen 4 and the functional film 3a respectively, the spaces pending air removal 6 still maintain an equal level of air pressure to the atmosphere 5, thus continues to cancel out the forces pushing upwards and downwards. In this case, the layers are not attached to each other and the screen protector 100 is not yet attached to the screen 4.

Figure 21:
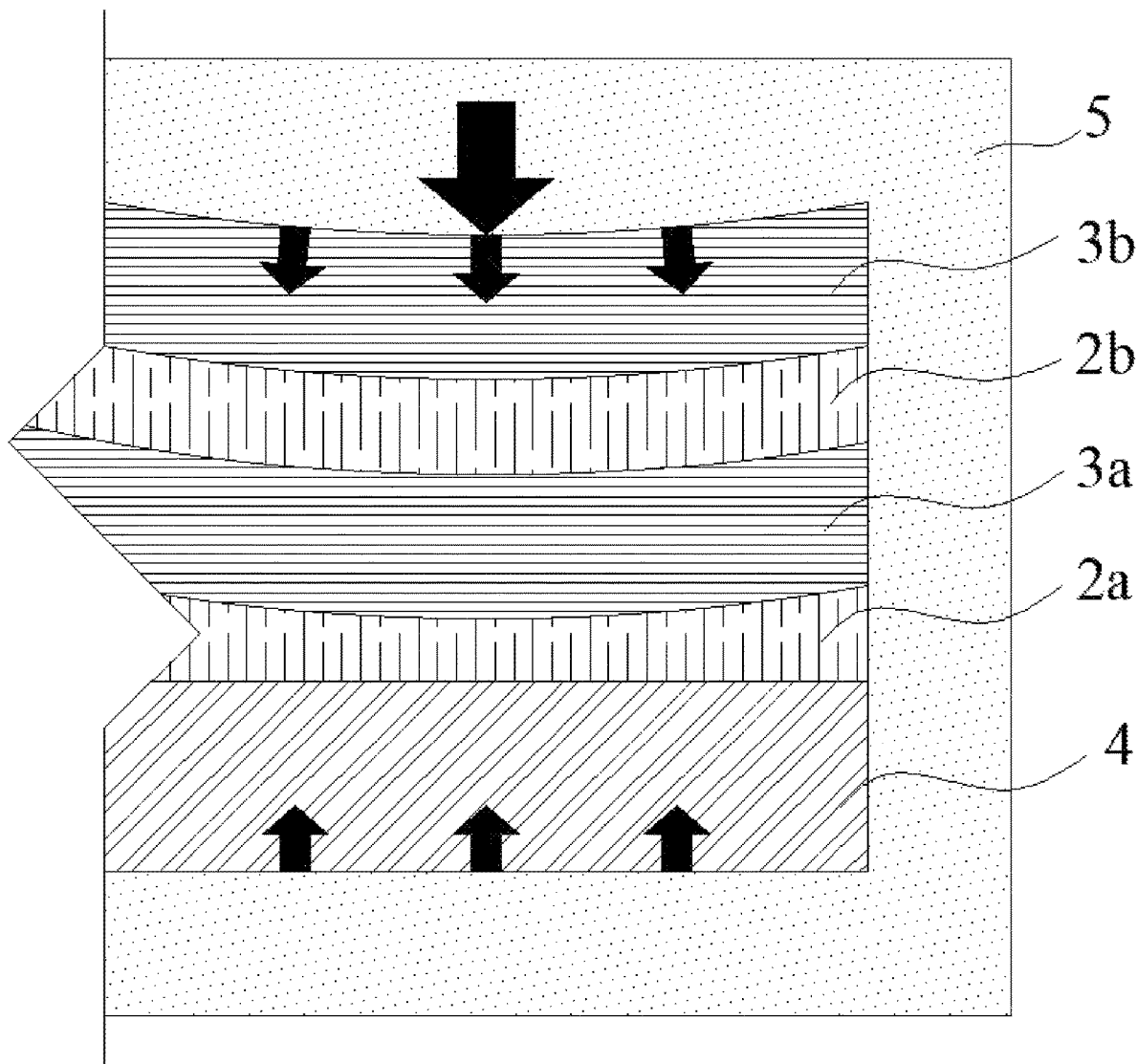
FIG. 21 is a schematic diagram that illustrates the structural mechanics of the first and second layers in the detachable and composable screen protector in Embodiment during installation.

During installation, as shown in FIG. 21, by pressing directly on the functional film 3b and indirectly on the functional film 3a, the air in the spaces pending air removal 6 will be squeezed out, turning air pressure much lower than the atmosphere. The air pressure difference with the atmosphere then generates a strong force pushing all the layers and the overall screen protector 100 downwards, making attachment to the screen 4.

Figure 22:
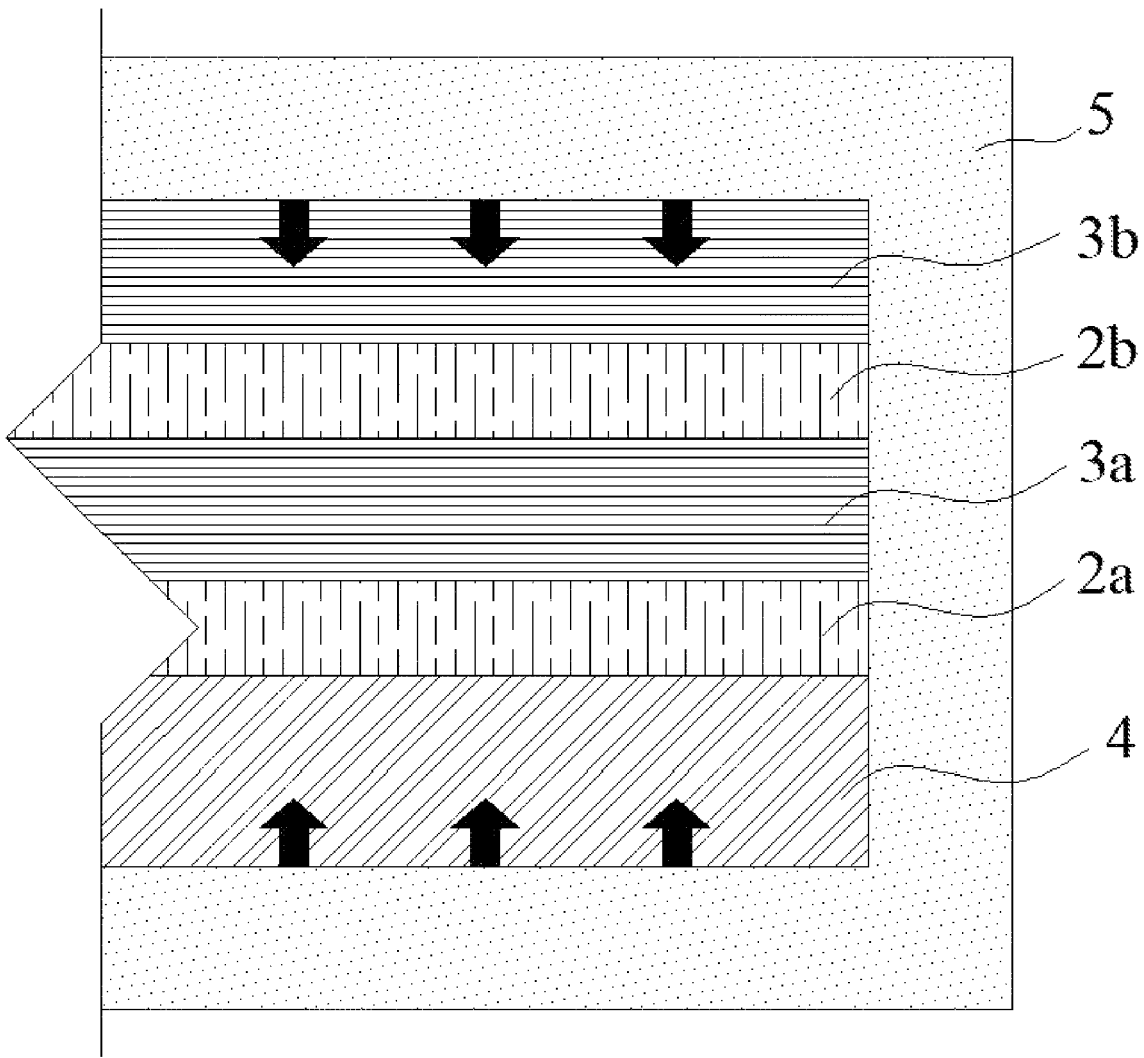
FIG. 22 is a schematic diagram that illustrates the structural mechanics of the first and second layers in the detachable and composable screen protector in Embodiment 3 after installation.
Figure 23:
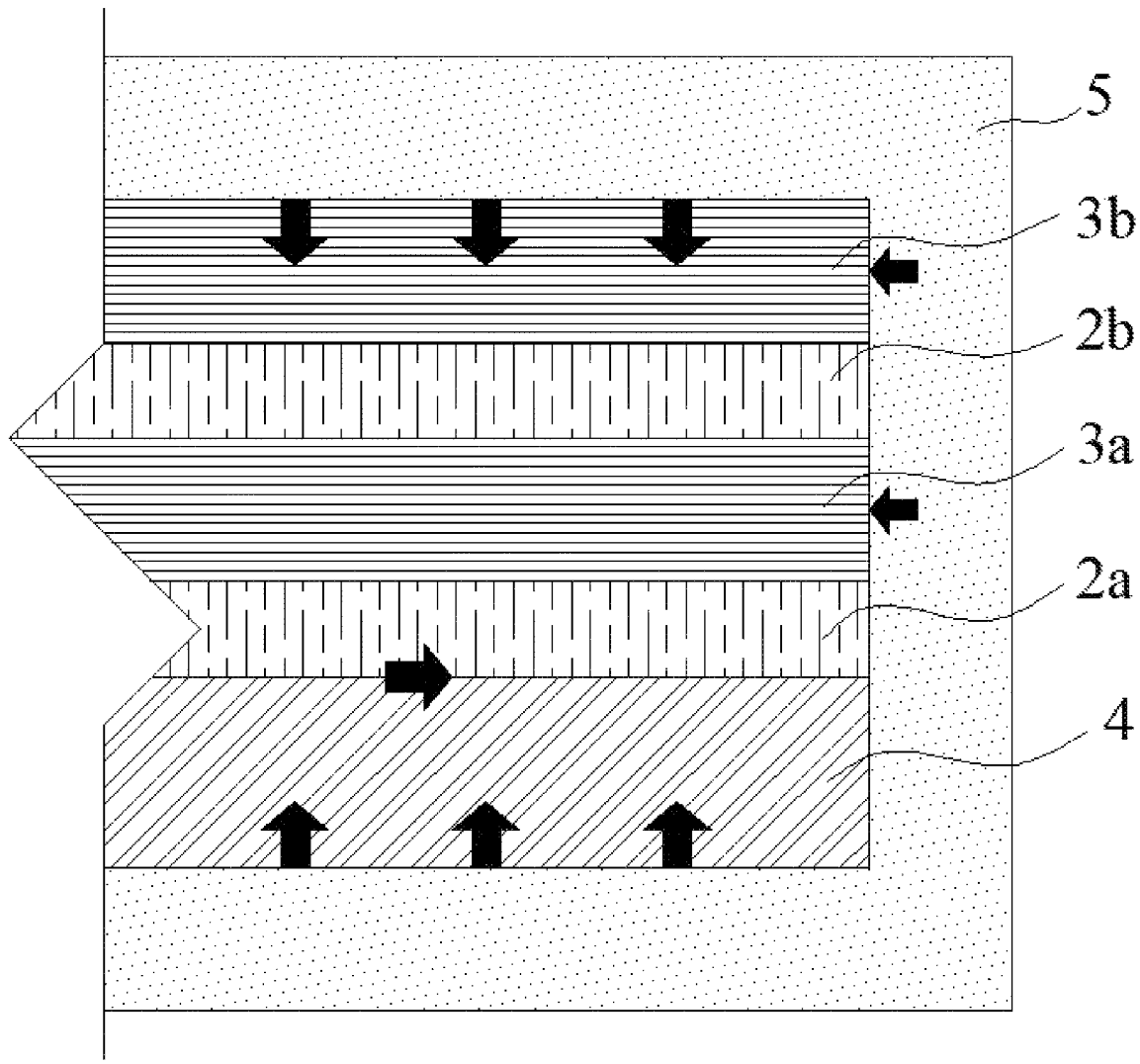
FIG. 23 is a schematic diagram that illustrates the structural mechanics of the first and second layers in the detachable and composable screen protector in Embodiment 3 after installation, with the presence of a lateral force trying to move the layers and the screen protector away.

After installation, as shown in FIG. 22, since the adsorption sheets 2a and 2b are made of TPU and are highly elastic, they can respectively fit to the surfaces of the screen 4 and the functional film 3a perfectly and turn the contact surfaces into hermetically sealed low-pressure or vacuum areas that last over time, maintaining the air pressure difference with the atmosphere 5 and the adsorption forces that hold the layers together and attach the screen protector 100 to the screen 4. Furthermore, due to the nature of these materials, the static friction coefficients between the contact surfaces are relatively large, and thus can generate considerable static friction forces to cancel out potential lateral forces that could drag the screen protector 100 away, generated during user writing.

Figure 24:
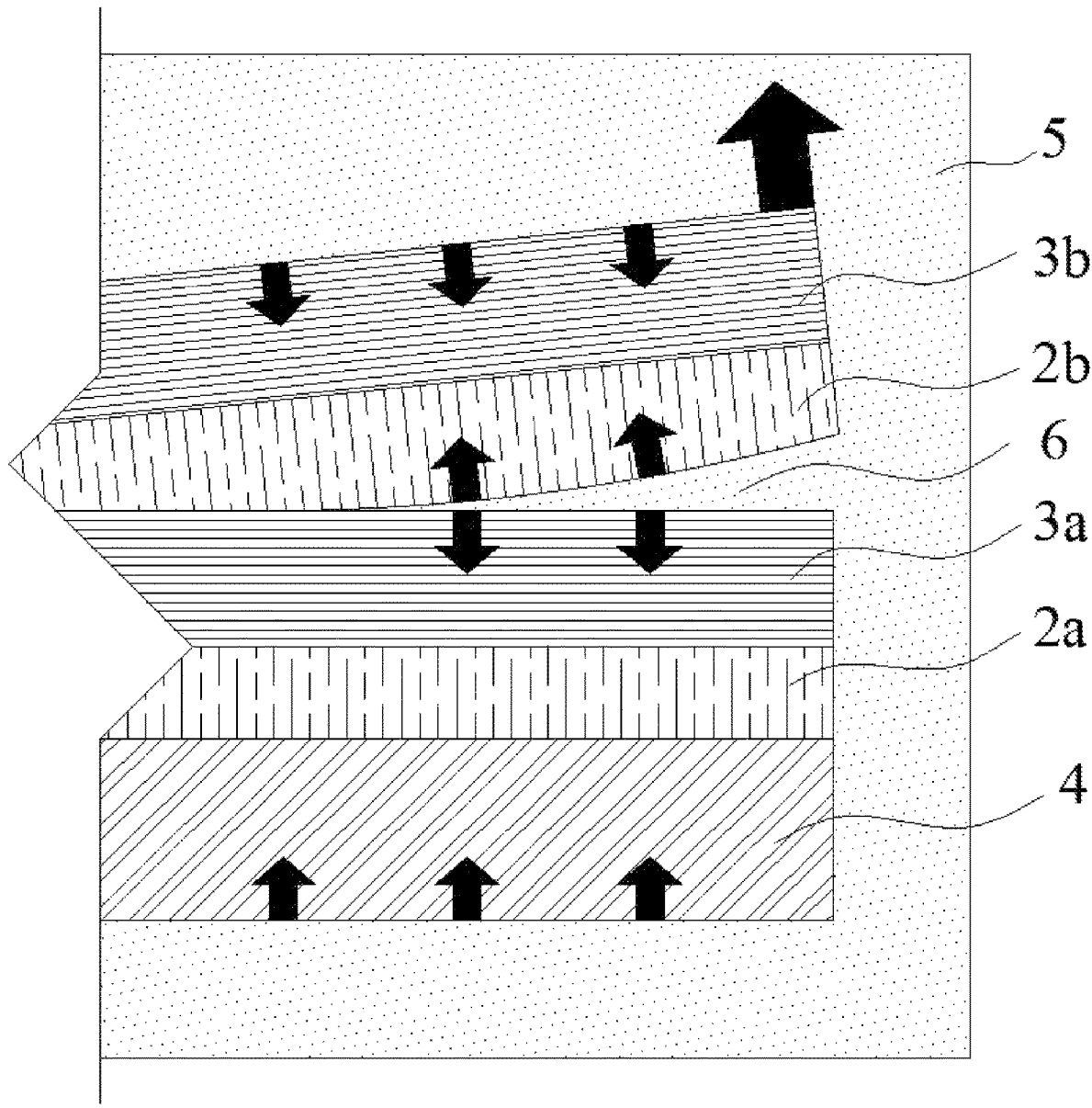
FIG. 24 is a schematic diagram that illustrates the structural mechanics of the detachable and composable screen protector in Embodiment 3 during removal of the second layer.
Figure 25:
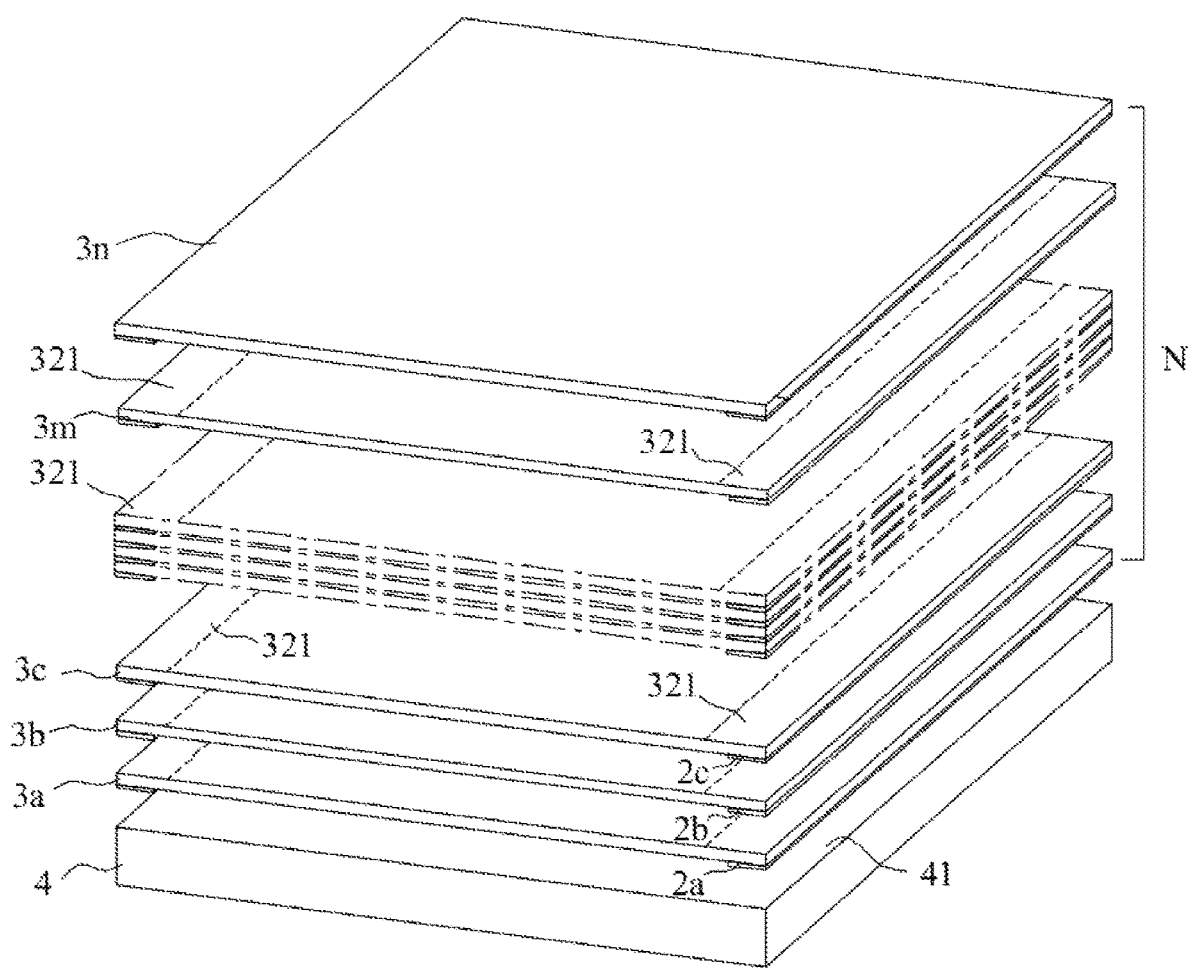
FIG. 25 is a schematic diagram of the detachable and composable screen protector in Embodiment 4 in a status that all the N layers are not attached to each other and the screen protector is not attached to the screen.
Figure 26:
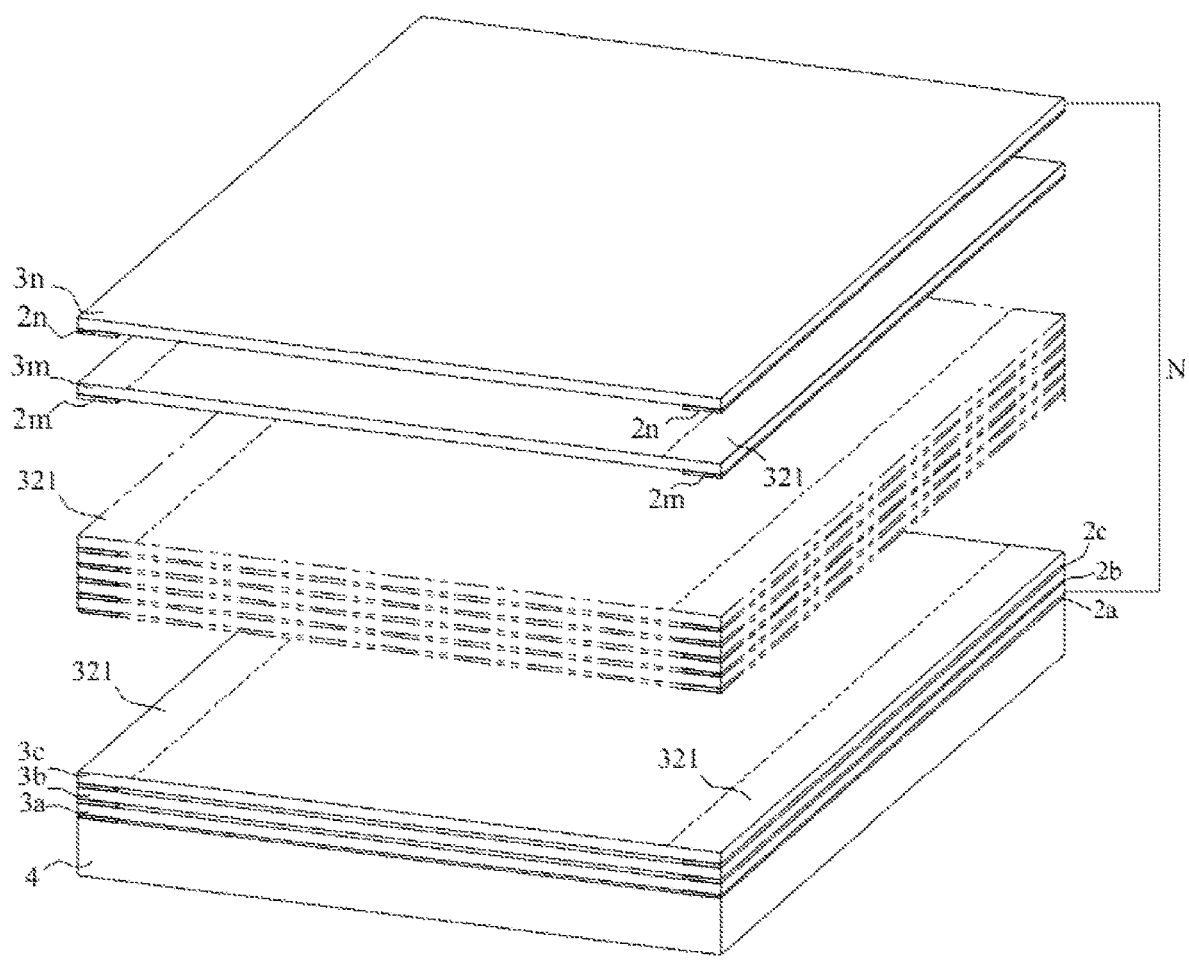
FIG. 26 is a schematic diagram of the detachable and composable screen protector in Embodiment 4 in a status that the first three layers are already installed on the screen surface.

During removal, as shown in FIG. 24, an external force must be applied to make a gap between the contact surfaces of the adsorption sheet 2b and the functional film 3a, for example by inserting a fingernail, which then lets in the air and quickly drops the air pressure difference with the atmosphere 5 to almost zero, canceling out the adsorption force and detaching the second layer from the first. The same applies to the detachment of the third layer from the second, and the removal of the overall screen protector 100 from the screen 4.

Detailed Embodiment 4: A General-Purpose Many-Layer Detachable and Composable Screen Protector 100

FIGS. 5 and 19-26 illustrate a general-purpose many-layer detachable and composable screen protector 100 that is capable of being installed and removed easily and repeatedly, as well as flexibly altering its functionalities through de-composition and re-composition. It has a non-permanent N-layer structure, where N is greater than or equal to 2. The first layer comprises a functional film 3a and two adsorption sheets 2a, the second layer comprises a functional film 3b and two adsorption sheets 2b, . . . , the Nth layer comprises a functional film 3n and two adsorption sheets 2n. For each layer, the functional film 1 comprises a front surface 11 facing towards the screen 4 and a back surface 12; the two adsorption sheets 2 are permanently fixed to the front surface 11 in the margin area 2'. In an exemplary embodiment, the functional film 1 comprises a front surface 31 facing towards the screen 4 and a back surface 32, and the back surface 32 comprises two smooth regions 321 that correspond to the locations of the two adsorption sheets 2.

By applying external pressure, for example by hand and/or electrostatic attraction and/or magnetic attraction, on the back surface 32 of the functional films 3a, 3b, . . . , 3m, 3n around the areas of the adsorption sheets 2a, 2b, . . . , 2m, 2n, either directly or indirectly, the air between the contact surfaces of the adsorption sheets 2a, 2b, . . . , 2n and the screen 4, functional films 3a, 3b, . . . , 3m respectively will be squeezed out, forming a series of hermetically sealed low-pressure or vacuum areas. The air pressure difference between the hermetically sealed low-pressure or vacuum areas and the atmosphere 5 generates a strong force, holding all the layers together and pushing the entire screen protector 100 to the screen surface 41. Meanwhile, the static friction coefficients between the adsorption sheets 2a/2b/ . . . /2n and the screen surface 41 or the smooth regions 321 in the previous layer is relatively large due to the nature of materials in use, therefore generate considerable static friction that prevents each layer and the overall screen protector 100 from slipping away.

Furthermore, each layer may be attached and detached separately, making the screen protector 100 easily composable, and additional layers comprising different types of functional films may be added to or replace the existing layers of the structure to further enhance its flexibility.

In short, the screen protector 100 may be installed and removed easily and repeatedly, while its layers may be equally detachable in its own right, making the overall solution easily composable, flexibly altering its functionalities to cater for complex changing usage scenarios.

The embodiments described above are merely examples of the present disclosure, and should not be used to limit the scope of the present disclosure, which may have various modifications and variations made by specialists in the field. Any modification, equivalent replacement or improvement made within the spirits and principles of the present disclosure shall be included in the scope of protection of the present disclosure.

The invention claimed is:

1. A detachable screen protector, comprising:
   a functional film, which comprises a front surface facing towards a screen and a back surface; and
   at least one adsorption sheet, which comprises a first side that is permanently fixed to the front surface of the functional film in a margin area; and a second side that contacts a screen surface; the adsorption sheet is elastically deformable to fit to the screen surface, making the screen protector attachable to the screen by removing air and forming a hermetically sealed area with lower air pressure than atmosphere between the adsorption sheet and the screen surface; and detachable from the screen by refilling air in the hermetically sealed area with lower air pressure than atmosphere between the adsorption sheet and the screen surface; the hermetically sealed area with lower air pressure than atmosphere is configured to generate an air pressure to keep the adsorption sheet attached to the screen surface.

2. The detachable screen protector of claim 1, wherein primary material of the adsorption sheet is elastic polymer.

3. The detachable screen protector of claim 2, wherein the adsorption sheet is made of any of the following materials: rubber, silicone rubber, silicone resin, thermoplastic elastomers (TPE), thermoplastic polyurethanes (TPU), soft polyvinyl chloride (PVC), thermoplastic hydrogel (TPH), polyurethane (PU) and polyethylene terephthalate (PETE).

4. The detachable screen protector of claim 2, wherein the second side of the adsorption sheet is electrostatically charged, generating electrostatic attraction between the adsorption sheet and the screen surface.

5. The detachable screen protector of claim 1, wherein functional film has a permanent single-layer or multi-layer structure, each layer is made of any of the following films: tempered glass film, normal glass film, ceramic film, sapphire film, thermoplastic polyurethanes (TPU) film, hydrogel film, normal plastic film, coated film, matte film, anti-fingerprint film, anti-glare film, anti-reflective film, low reflective film, transmittance-enhancing film, anti-peeping film, anti-blue light film, handwriting film, or paper-feel film.

6. The detachable screen protector of claim 5, wherein the front surface of the functional film is electrostatically charged, generating electrostatic attraction between the functional film and the screen surface.

7. The detachable screen protector of claim 5, wherein the functional film is transparent or translucent.

8. The detachable screen protector of claim 1, wherein the first side of the adsorption sheet is permanently fixed to the functional film by bonding, solvent-dissolving connection, riveting, welding, or soldering.

9. The detachable screen protector of claim 8, wherein permanent fixation of the first side of the adsorption sheet to the functional film involve bonding with the use of optically clear adhesives (OCA).

10. The detachable screen protector of claim 1, wherein the second side of each adsorption sheet is connected to the screen surface without an adhesive.

11. A detachable and composable screen protector, comprising:
N layers, wherein each layer is attached to its previous layer, except for the first layer which attaches directly to the screen surface, each layer is capable of being attached and detached separately, and comprises:
a functional film, which comprises a front surface facing towards a screen and a back surface;
at least one adsorption sheet, which comprises a first side that is permanently fixed to the front surface in a margin area of the functional film in the same layer; and a second side that is attached to a screen surface or a previous layer; wherein each adsorption sheet is elastically deformable to fit to the screen surface or the previous layer, making the screen protector attachable to the screen surface or each layer attachable to the previous layer by removing air and forming a hermetically sealed area with lower air pressure than atmosphere between the adsorption sheet and the screen surface or between the adsorption sheet and the previous layer; and making the screen protector detachable from the screen surface or each layer detachable from the previous layer by refilling air in the hermetically sealed area with lower air pressure than atmosphere; the hermetically sealed area with lower air pressure than atmosphere is configured to generate an air pressure to keep the adsorption sheet attached to the screen surface or the previous layer.

12. The detachable and composable screen protector of claim 11, wherein in each layer from the first to the (N−1)th, the functional film comprises a smooth region on the back surface corresponding to a position of each adsorption sheet in a next layer; in each layer from the second to the Nth, the adsorption sheet is attachable to and detachable from the smooth region on the functional film in the previous layer.

13. The detachable and composable screen protector of claim 11, wherein primary material of the adsorption sheet is elastic polymer.

14. The detachable and composable screen protector of claim 13, wherein the adsorption sheet is made of any of the following materials: rubber, silicone rubber, silicone resin, thermoplastic elastomers (TPE), thermoplastic polyurethanes (TPU), soft polyvinyl chloride (PVC), thermoplastic hydrogel (TPH), polyurethane (PU) and polyethylene terephthalate (PETE).

15. The detachable and composable screen protector of claim 13, wherein the second side of the adsorption sheet in each layer is electrostatically charged, generating electrostatic attraction between the adsorption sheet and the screen surface, or the functional film in the previous layer.

16. The detachable and composable screen protector of claim 11, wherein the functional film has a permanent single-layer or multi-layer structure, each layer is made of any of the following films: tempered glass film, normal glass film, ceramic film, sapphire film, thermoplastic polyurethanes (TPU) film, hydrogel film, normal plastic film, coated film, matte film, anti-fingerprint film, anti-glare film, anti-reflective film, low reflective film, transmittance-enhancing film, anti-peeping film, anti-blue light film, handwriting film, or paper-feel film.

17. The detachable and composable screen protector of claim 16, wherein the front surface of the functional film in each layer is electrostatically charged, generating electrostatic attraction between the functional film and the screen surface, or the functional film in the previous layer.

18. The detachable and composable screen protector of claim 16, wherein the functional film in each layer is transparent or translucent.

19. The detachable and composable screen protector of claim 11, wherein the first side of the adsorption sheet in each layer is permanently fixed to the functional film in the same layer by bonding, solvent-dissolving connection, riveting, welding, or soldering.

20. The detachable and composable screen protector of claim 19, wherein permanent fixation of the first side of the adsorption sheet to the functional film involve bonding with the use of optically clear adhesives (OCA).

21. The detachable and composable screen protector of claim 11, wherein the second side of each adsorption sheet is connected to the screen surface or the previous layer without an adhesive.

* * * * *